United States Patent
Tylik et al.

(10) Patent No.: US 11,822,801 B2
(45) Date of Patent: Nov. 21, 2023

(54) AUTOMATED UNIFORM HOST ATTACHMENT

(71) Applicant: EMC IP Holding Company LLC, Hopkinton, MA (US)

(72) Inventors: Dmitry Tylik, Westborough, MA (US); Dave J. Lindner, Nashua, NH (US); Girish Sheelvant, Hopkinton, MA (US); Nagasimha G. Haravu, Apex, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 223 days.

(21) Appl. No.: 17/197,467

(22) Filed: Mar. 10, 2021

(65) Prior Publication Data

US 2022/0291851 A1  Sep. 15, 2022

(51) Int. Cl.
*G06F 3/06* (2006.01)

(52) U.S. Cl.
CPC .......... *G06F 3/0635* (2013.01); *G06F 3/0604* (2013.01); *G06F 3/065* (2013.01); *G06F 3/0644* (2013.01); *G06F 3/0659* (2013.01); *G06F 3/0683* (2013.01)

(58) Field of Classification Search
None
See application file for complete search history.

(56) References Cited

U.S. PATENT DOCUMENTS

| | | | |
|---|---|---|---|
| 10,680,932 B1 * | 6/2020 | Colgrove | H04L 45/12 |
| 11,169,727 B1 * | 11/2021 | Doucette | G06F 3/0604 |

OTHER PUBLICATIONS

Dell EMC SRDF Introduction, Sep. 2019 (Year: 2019).*
Purity ActiveCluster: Simple Stretch Clustering for All, Jun. 12, 2017 (Year: 2017).*
Hosterman, Cody, Setting up iSCSI with VMware ESXi and the FlashArray, Feb. 25, 2015 (Year: 2015).*

* cited by examiner

*Primary Examiner* — Arpan P. Savla
*Assistant Examiner* — Edmund H Kwong
(74) *Attorney, Agent, or Firm* — Muirhead and Saturnelli, LLC

(57) ABSTRACT

Configuring systems to provide host access may include: configuring a stretched volume; and performing processing that allows the host access to the stretched volume. The processing may include: receiving a first command to create a first host object for access control for the host in the first data storage system; in response to receiving the first command, performing first processing including: creating the first host object that includes an initiator set of the host; and creating a second host object on the second data storage system, wherein the second host object includes the initiator set and specifies access control in the second data storage system for the host; receiving a second command to map the stretched volume to the first host object; and in response to receiving the second command, granting the host access to the stretched volume on the first data storage system and the second data storage system.

20 Claims, 11 Drawing Sheets

AUTOMATED UNIFORM HOST ATTACHMENT

BACKGROUND

Technical Field

This application generally relates to data storage.

Description of Related Art

Systems may include different resources used by one or more host processors. The resources and the host processors in the system may be interconnected by one or more communication connections, such as network connections. These resources may include data storage devices such as those included in data storage systems. The data storage systems may be coupled to one or more host processors and provide storage services to each host processor. Multiple data storage systems from one or more different vendors may be connected and may provide common data storage for the one or more host processors.

A host may perform a variety of data processing tasks and operations using the data storage system. For example, a host may issue I/O operations, such as data read and write operations, received at a data storage system. The host systems may store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device may also be provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host may be directed to a particular storage entity, such as a file or logical device. The logical devices may or may not correspond to the actual physical drives. Allowing multiple host systems to access the single data storage system allows the host systems to share data stored therein.

SUMMARY OF THE INVENTION

Various embodiments of the techniques herein may include a method, a system and a computer readable medium for configuring data storage systems to provide host access comprising: configuring a stretched volume using a first volume on a first data storage system and a second volume on a second data storage system, wherein the first volume is exposed over a first path to a host and the second volume is exposed over a second path to the host, wherein the first volume and the second volume are configured as a same logical volume and exposed to the host as the same logical volume over a plurality of paths including the first path and the second path, wherein the first path is between the host and the first data storage system and the second path is between the host and the second data storage system; and performing processing that allows the host access to the stretched volume over the plurality of paths, said processing including: receiving a first command to create a first host object that is stretched, wherein the first host object specifies access control in the first data storage system for the host; in response to receiving the first command, performing first processing including: creating the first host object that is stretched on the first data storage system, wherein the first host object includes a first initiator set comprising one or more initiators of the host; and creating a second host object that is stretched on the second data storage system, wherein the second host object includes the first initiator set and specifies access control in the second data storage system for the host; receiving a second command to map the stretched volume to the first host object that is stretched; and in response to receiving the second command, performing second processing including granting the host access to the stretched volume on the first data storage system and the second data storage system. The first initiator set may be discovered by the first data storage system based on initiators of the host that are logged into one or more target ports of the first data storage system. The first initiator set may be included as input parameter of the first command. The first initiator set may be used to uniquely identify the host from a plurality of other hosts, wherein the plurality of other hosts and the host may be connected to the first data storage system and also connected to the second data storage system.

In at least one embodiment, the host may include a first initiator and a second initiator, wherein the first initiator set may include the first initiator and the second initiator, and wherein the first path may be from the first initiator to a first target port of the first data storage system and the second path may be from the second initiator to a second target port of the second data storage system. The first volume and the second volume may be configured for synchronous replication of writes from the first volume to the second volume and synchronous replication of writes from the second volume to the first volume. The second processing may include: mapping the stretched volume to the first host object to grant the host access to the stretched volume on the first data storage system; and mapping the stretched volume to the second host object on the second data storage system to grant the host access to the stretched volume on the second data storage system. Mapping the stretched volume to first host object may include mapping the first volume to the first host object, and mapping the stretched volume to second host object may include mapping the second volume to the second host object.

In at least one embodiment, processing may include: receiving a third command to perform a modification to the first host object that is a stretched; and in response to receiving the third command, performing third processing including: updating the first host object in accordance with the modification; and updating the second host object on the second data storage system in accordance with the modification.

In at least one embodiment, a third host object on the first data storage system may represent a second host connected to the first data storage system, wherein the third host object may be unstretched or local indicating that the second host has connectivity to the first data storage system but not the second data storage system. Processing may include receiving a third command to stretch the third host object; and in response to receiving the third command, performing third processing including: setting an attribute of the third host object to indicate that the second host object is stretched; creating a fourth host object that is stretched on the second data storage system for the second host, wherein the third host object and the fourth host object each include a second initiator set of one or more initiators of the second host. Processing may include receiving a fourth command to map a third volume of the first data storage system to the third host object; and in response to receiving the fourth command, granting the third host object access to the third volume, wherein the third volume is not a stretched volume.

In at least one embodiment, a first parameter of the first command may identify that the first data storage system is local with respect to the host whereby the host is co-located in a same data center as the first data storage system. The first processing may include setting at least one path from the host to the first data storage system to active optimized; and setting at least one path from the host to the second data storage system to active non-optimized. The first path from the host to the first data storage system may be active optimized and the second path from the host to the second data storage system may be active non-optimized. Processing performed may include selecting, by the host, a particular path over which to send an I/O operation directed to the same logical volume, wherein said selecting selects the first path as the particular path rather than the second path since the first path is active optimized and the second path is active non-optimized; and sending the I/O operation directed to the same logical volume over the first path from the host to the first data storage system.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
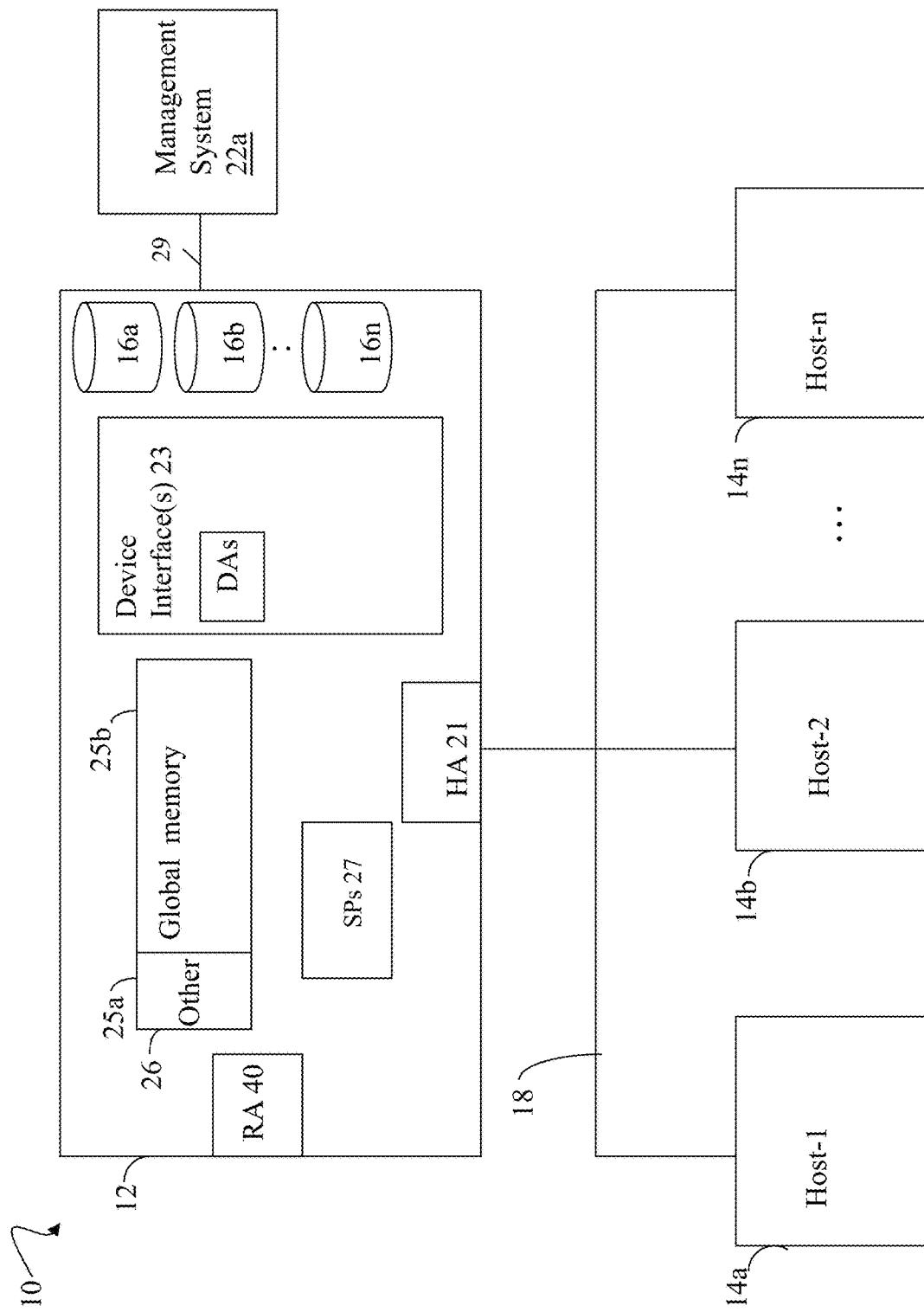
FIG. 1 is an example of components that may be included in a system in accordance with the techniques described herein.

Referring to the FIG. 1, shown is an example of an embodiment of a system 10 that may be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host systems 14a-14n and data storage system 12 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the hosts 14a-14n and the data storage system 12 may all be located at the same physical site, or, alternatively, may also be located in different physical locations. The communication medium 18 used for communication between the host systems 14a-14n and the data storage system 12 of the system 10 may use a variety of different communication protocols such as block-based protocols (e.g., SCSI (Small Computer System Interface), Fibre Channel (FC), iSCSI), file system-based protocols (e.g., NFS or network file server), and the like. Some or all of the connections by which the hosts 14a-14n and the data storage system 12 may be connected to the communication medium 18 may pass through other communication devices, such as switching equipment, a phone line, a repeater, a multiplexer or even a satellite.

Each of the host systems 14a-14n may perform data operations. In the embodiment of the FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although the element 12 is illustrated as a single data storage system, such as a single data storage array, the element 12 may also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment may include data storage arrays or other components from one or more vendors. In subsequent examples illustrating the techniques herein, reference may be made to a single data storage array by a vendor. However, as will be appreciated by those skilled in the art, the techniques herein are applicable for use with other data storage arrays by other vendors and with other components than as described herein for purposes of example.

The data storage system 12 may be a data storage appliance or a data storage array including a plurality of data storage devices (PDs) 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. SSDs may refer to solid state electronics devices as distinguished from electromechanical devices, such as hard drives, having moving parts. Flash devices or flash memory-based SSDs are one type of SSD that contains no moving mechanical parts. The flash devices may be constructed using nonvolatile semiconductor NAND flash memory. The flash devices may include, for example, one or more SLC (single level cell) devices and/or MLC (multi level cell) devices.

The data storage array may also include different types of controllers, adapters or directors, such as an HA 21 (host adapter), RA 40 (remote adapter), and/or device interface(s) 23. Each of the adapters (sometimes also known as controllers, directors or interface components) may be implemented using hardware including a processor with a local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from one of the hosts 14a-n. The data storage array may include one or more RAs that may be used, for example, to facilitate communications between data storage arrays. The data storage array may also include one or more device interfaces 23 for facilitating data transfers to/from the data storage devices 16a-16n. The data storage device interfaces 23 may include device interface modules, for example, one or more disk adapters (DAs) (e.g., disk controllers) for interfacing with the flash drives or other physical storage devices (e.g., PDS 16a-n). The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, the HAs and/or the RAs in a data storage array. In one embodiment, the device interfaces 23 may perform data operations using a system cache that may be included in the global memory 25b, for example, when communicating with other device interfaces and other components of the data storage array. The other portion 25a is that portion of the memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

The host systems 14a-14n provide data and access control information through channels to the storage systems 12, and the storage systems 12 may also provide data to the host systems 14a-n also through the channels. The host systems 14a-n do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of storage space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may include one or more type of device interface used in connection with facilitating data transfers to/from the associated disk drive(s) and LUN (s) residing thereon. For example, such device interfaces may include a device interface used in connection with facilitating data transfers to/from the associated flash devices and LUN(s) residing thereon. It should be noted that an embodiment may use the same or a different device interface for one or more different types of devices than as described herein.

In an embodiment in accordance with the techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

It should be noted that although examples of the techniques herein may be made with respect to a physical data storage system and its physical components (e.g., physical hardware for each HA, DA, HA port and the like), the techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that may be used to manage and monitor the data storage system 12. In one embodiment, the management system 22a may be a computer system which includes data storage system management software or application such as may execute in a web browser. A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

Information regarding the data storage system configuration may be stored in any suitable data container, such as a database. The data storage system configuration information stored in the database may generally describe the various physical and logical entities in the current data storage system configuration. The data storage system configuration information may describe, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule or other trigger conditions of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

Consistent with other discussion herein, management commands issued over the control or data path may include commands that query or read selected portions of the data storage system configuration, such as information regarding the properties or attributes of one or more LUNs. The management commands may also include commands that write, update, or modify the data storage system configuration, such as, for example, to create or provision a new LUN (e.g., which may result in modifying one or more database tables such as to add information for the new LUN), to modify an existing replication schedule or configuration (e.g., which may result in updating existing information in one or more database tables for the current replication schedule or configuration), to delete a LUN (e.g., which may include deleting the LUN from a table of defined LUNs and may also include modifying one or more other database tables to delete any existing snapshots of the LUN being deleted), and the like.

It should be noted that each of the different controllers or adapters, such as each HA, DA, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of the FIG. 1 may be a data storage system, such as a data storage array, that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, the memory 26 may represent memory of each such storage processor.

Generally, the techniques herein may be used in connection with any suitable storage system, appliance, device, and the like, in which data is stored. For example, an embodiment may implement the techniques herein using a midrange data storage system, such as a Dell EMC Unity® data storage system or a Dell EMC PowerStore® data storage system, as well as a high end or enterprise data storage system, such as a Dell EMC™ PowerMAX™ data storage system.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to the FIG. 1, the control commands may be issued from data storage management software executing on the management system 22a to the data storage system 12. Such commands may be, for example, to establish or modify data services, provision storage, perform user account management, and the like. Consistent with other discussion herein, the management commands may result in processing that includes reading and/or modifying information in the database storing data storage system configuration information. For example, management commands that read and/or modify the data storage system configuration information in the database may be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to the FIG. 1, a data storage system may have a separate physical connection 29 from a management system 22a to the data storage system 12 being managed whereby control commands may be issued over such a physical connection 29. However, it may be that user I/O commands are never issued over such a physical connection 29 provided solely for purposes of connecting the management system to the data storage system. In any case, the data path and control path each define two separate logical flow paths.

Figure 2:
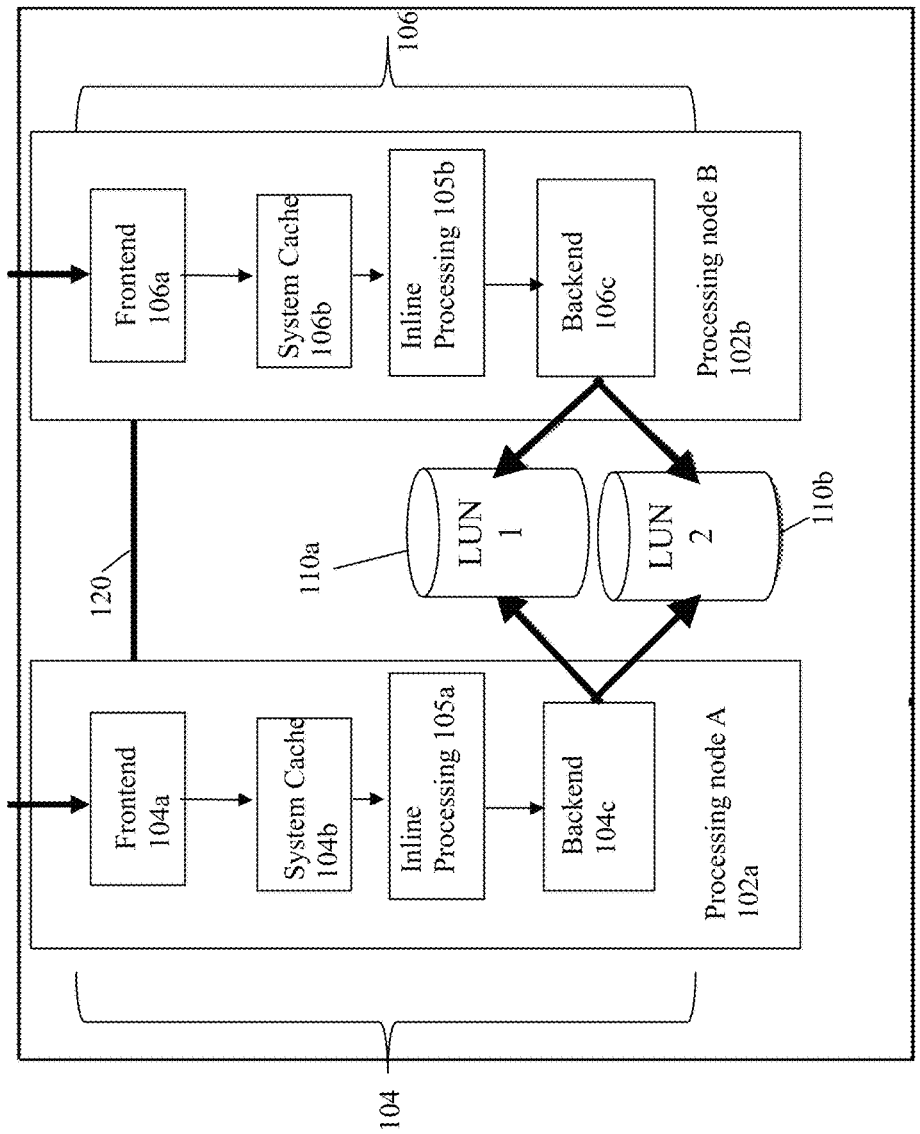
FIG. 2 is an example illustrating the I/O path or data path in connection with processing data in an embodiment in accordance with the techniques herein.

With reference to the FIG. 2, shown is an example 100 illustrating components that may be included in the data path in at least one existing data storage system in accordance with the techniques herein. The example 100 includes two processing nodes A 102a and B 102b and the associated software stacks 104, 106 of the data path, where I/O requests may be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing may be performed by layer 105a. Such inline processing operations of 105a may be optionally performed and may include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing may include, for example, performing one or more data reduction operations such as data deduplication or data compression. The inline processing may include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O may be directed to a location or logical address of a LUN and where data may be read from, or written to, the logical address. The LUNs 110a, 110b are examples of storage objects representing logical storage entities included in an existing data storage system configuration. Since, in this example, writes directed to the LUNs 110a, 110b may be received for processing by either of the nodes 102a and 102b, the example 100 illustrates what may also be referred to as an active-active configuration.

In connection with a write operation as may be received from a host and processed by the processing node A 102a, the write data may be written to the system cache 104b, marked as write pending (WP) denoting it needs to be written to the physical storage 110a, 110b and, at a later point in time, the write data may be destaged or flushed from the system cache to the physical storage 110a, 110b by the BE component 104c. The write request may be considered complete once the write data has been stored in the system cache whereby an acknowledgement regarding the completion may be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations may be performed. For example, the inline processing may include performing data compression processing, data deduplication processing, and the like, that may convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b may be stored in a modified form where processing is performed by 105a to restore or convert the modified form of the data to its original data form prior to returning the requested read data to the host.

Also illustrated in FIG. 2 is an internal network interconnect 120 between the nodes 102a, 102b. In at least one embodiment, the interconnect 120 may be used for internode communication between the nodes 102a, 102b.

In connection with at least one embodiment in accordance with the techniques herein, each processor or CPU may include its own private dedicated CPU cache (also sometimes referred to as processor cache) that is not shared with other processors. In at least one embodiment, the CPU cache, as in general with cache memory, may be a form of fast memory (relatively faster than main memory which may be a form of RAM). In at least one embodiment, the CPU or processor cache is on the same die or chip as the processor and typically, like cache memory in general, is far more expensive to produce than normal RAM such as may be used as main memory. The processor cache may be substantially faster than the system RAM such as used as main memory and contains information that the processor will be immediately and repeatedly accessing. The faster memory of the CPU cache may, for example, run at a refresh rate that's closer to the CPU's clock speed, which minimizes wasted cycles. In at least one embodiment, there may be two or more levels (e.g., L1, L2 and L3) of cache. The CPU or processor cache may include at least an L1 level cache that is the local or private CPU cache dedicated for use only by that particular processor. The two or more levels of cache in a system may also include at least one other level of cache (LLC or lower level cache) that is shared among the different CPUs. The L1 level cache serving as the dedicated CPU cache of a processor may be the closest of all cache levels (e.g., L1-L3) to the processor which stores copies of the data from frequently used main memory locations. Thus, the system cache as described herein may include the CPU cache (e.g., the L1 level cache or dedicated private CPU/processor cache) as well as other cache levels (e.g., the LLC) as described herein. Portions of the LLC may be used, for example, to initially cache write data which is then flushed to the backend physical storage such as BE PDs providing non-volatile storage. For example, in at least one embodiment, a RAM based memory may be one of the caching layers used as to cache the write data that is then flushed to the backend physical storage. When the processor performs processing, such as in connection with the inline processing 105a, 105b as noted above, data may be loaded from the main memory and/or other lower cache levels into its CPU cache.

In at least one embodiment, the data storage system may be configured to include one or more pairs of nodes, where each pair of nodes may be generally as described and represented as the nodes 102a-b in the FIG. 2. For example, a data storage system may be configured to include at least one pair of nodes and at most a maximum number of node pairs, such as for example, a maximum of 4 node pairs. The maximum number of node pairs may vary with embodiment. In at least one embodiment, a base enclosure may include the minimum single pair of nodes and up to a specified maximum number of PDs. In some embodiments, a single base enclosure may be scaled up to have additional BE non-volatile storage using one or more expansion enclosures, where each expansion enclosure may include a number of additional PDs. Further, in some embodiments, multiple base enclosures may be grouped together in a load-balancing cluster to provide up to the maximum number of node pairs. Consistent with other discussion herein, each node may include one or more processors and memory. In at least one embodiment, each node may include two multi-core processors with each processor of the node having a core count of between 8 and 28 cores. In at least one embodiment, the PDs may all be non-volatile SSDs, such as flash-based storage devices and storage class memory (SCM) devices. It should be noted that the two nodes configured as a pair may also sometimes be referred to as peer nodes. For example, the node A 102a is the peer node of the node B 102b, and the node B 102b is the peer node of the node A 102a.

In at least one embodiment, the data storage system may be configured to provide both block and file storage services with a system software stack that includes an operating system running directly on the processors of the nodes of the system.

In at least one embodiment, the data storage system may be configured to provide block-only storage services (e.g., no file storage services). A hypervisor may be installed on each of the nodes to provide a virtualized environment of virtual machines (VMs). The system software stack may execute in the virtualized environment deployed on the hypervisor. The system software stack (sometimes referred to as the software stack or stack) may include an operating system running in the context of a VM of the virtualized environment. Additional software components may be included in the system software stack and may also execute in the context of a VM of the virtualized environment.

In at least one embodiment, each pair of nodes may be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes may not be shared with other pairs of nodes. A host may access data stored on a BE PD through the node pair associated with or attached to the PD.

In at least one embodiment, each pair of nodes provides a dual node architecture where both nodes of the pair may be identical in terms of hardware and software for redundancy and high availability. Consistent with other discussion herein, each node of a pair may perform processing of the different components (e.g., FA, DA, and the like) in the data path or I/O path as well as the control or management path. Thus, in such an embodiment, different components, such as the FA, DA and the like of FIG. 1, may denote logical or functional components implemented by code executing on the one or more processors of each node. Each node of the pair may include its own resources such as its own local (i.e., used only by the node) resources such as local processor(s), local memory, and the like.

Data replication is one of the data services that may be performed on a data storage system in an embodiment in accordance with the techniques herein. In at least one data storage system, remote replication is one technique that may be used in connection with providing for disaster recovery (DR) of an application's data set. The application, such as executing on a host, may write to a production or primary data set of one or more LUNs on a primary data storage system. Remote replication may be used to remotely replicate the primary data set of LUNs to a second remote data storage system. In the event that the primary data set on the primary data storage system is destroyed or more generally unavailable for use by the application, the replicated copy of the data set on the second remote data storage system may be utilized by the host. For example, the host may directly access the copy of the data set on the second remote system. As an alternative, the primary data set of the primary data storage system may be restored using the replicated copy of the data set, whereby the host may subsequently access the restored data set on the primary data storage system. A remote data replication service or facility may provide for automatically replicating data of the primary data set on a first data storage system to a second remote data storage system in an ongoing manner in accordance with a particular replication mode, such as a synchronous mode described elsewhere herein.

Figure 3:
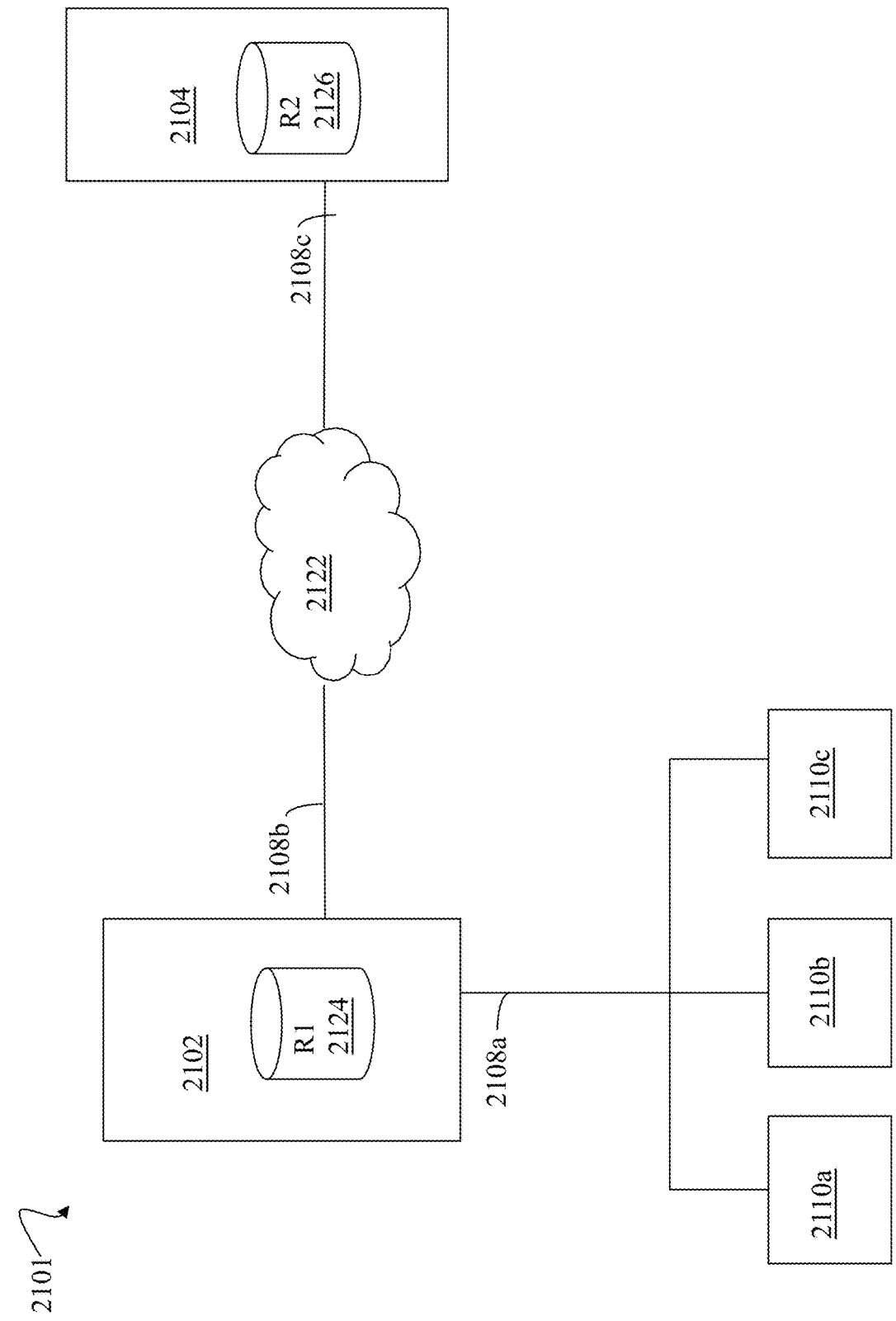
FIG. 3 is an example of systems that may be used in performing data replication.

Referring to FIG. 3, shown is an example 2101 illustrating remote data replication. It should be noted that the embodiment illustrated in FIG. 3 presents a simplified view of some of the components illustrated in FIGS. 1 and 2, for example, including only some detail of the data storage systems 12 for the sake of illustration.

Included in the example 2101 are the data storage systems 2102 and 2104 and the hosts 2110a, 2110b and 1210c. The data storage systems 2102, 2104 may be remotely connected and communicate over the network 2122, such as the Internet or other private network, and facilitate communications with the components connected thereto. The hosts 2110a, 2110b and 2110c may perform operations to the data storage system 2102 over the connection 2108a. The hosts 2110a, 2110b and 2110c may be connected to the data storage system 2102 through the connection 2108a which may be, for example, a network or other type of communication connection.

The data storage systems 2102 and 2104 may include one or more devices. In this example, the data storage system 2102 includes the storage device R1 2124, and the data storage system 104 includes the storage device R2 2126. Both of the data storage systems 2102, 2104 may include one or more other logical and/or physical devices. The data storage system 2102 may be characterized as local with respect to the hosts 2110a, 2110b and 2110c. The data storage system 104 may be characterized as remote with respect to the hosts 2110a, 2110b and 2110c. The R1 and R2 devices may be configured as LUNs.

The host 1210a may issue a command, such as to write data to the device R1 of the data storage system 2102. In some instances, it may be desirable to copy data from the storage device R1 to another second storage device, such as R2, provided in a different location so that if a disaster occurs that renders R1 inoperable, the host (or another host) may resume operation using the data of R2. With remote replication, a user may denote a first storage device, such as R1, as a primary storage device and a second storage device, such as R2, as a secondary storage device. In this example, the host 2110a interacts directly with the device R1 of the data storage system 2102, and any data changes made are automatically provided to the R2 device of the data storage system 2104 by a remote replication facility (RRF). In operation, the host 110a may read and write data using the R1 volume in 2102, and the RRF may handle the automatic copying and updating of data from R1 to R2 in the data storage system 2104. Communications between the storage systems 2102 and 2104 may be made over connections 2108b, 2108c to the network 2122.

A RRF may be configured to operate in one or more different supported replication modes. For example, such modes may include synchronous mode and asynchronous mode, and possibly other supported modes. When operating in the synchronous mode, the host does not consider a write I/O operation to be complete until the write I/O has been completed on both the first and second data storage systems. Thus, in the synchronous mode, the first or source storage system will not provide an indication to the host that the write operation is committed or complete until the first storage system receives an acknowledgement from the second data storage system regarding completion or commitment of the write by the second data storage system. In contrast, in connection with the asynchronous mode, the host receives an acknowledgement from the first data storage system as soon as the information is committed to the first data storage system without waiting for an acknowledgement from the second data storage system.

With synchronous mode remote data replication, a host 2110a may issue a write to the R1 device 2124. The primary or R1 data storage system 2102 may store the write data in its cache at a cache location and mark the cache location as including write pending (WP) data as mentioned elsewhere herein. The RRF operating in the synchronous mode may propagate the write data across an established connection or link (more generally referred to as a the remote replication link or link) such as over 2108b, 2122, and 2108c, to the secondary or R2 data storage system 2104 where the write data may be stored in the cache of the system 2104 at a cache location that is marked as WP. Once the write data is stored in the cache of the system 2104 as described, the R2 data storage system 2104 may return an acknowledgement to the R1 data storage system 2102 that it has received the write data. Responsive to receiving this acknowledgement from the R2 data storage system 2104, the R1 data storage system 2102 may return an acknowledgement to the host 2110a that the write has been received and completed. Thus, generally, R1 device 2124 and R2 device 2126 may be logical devices, such as LUNs, configured as mirrors of one another. R1 and R2 devices may be, for example, fully provisioned LUNs, such as thick LUNs, or may be LUNs that are thin or virtually provisioned logical devices.

Figure 4:
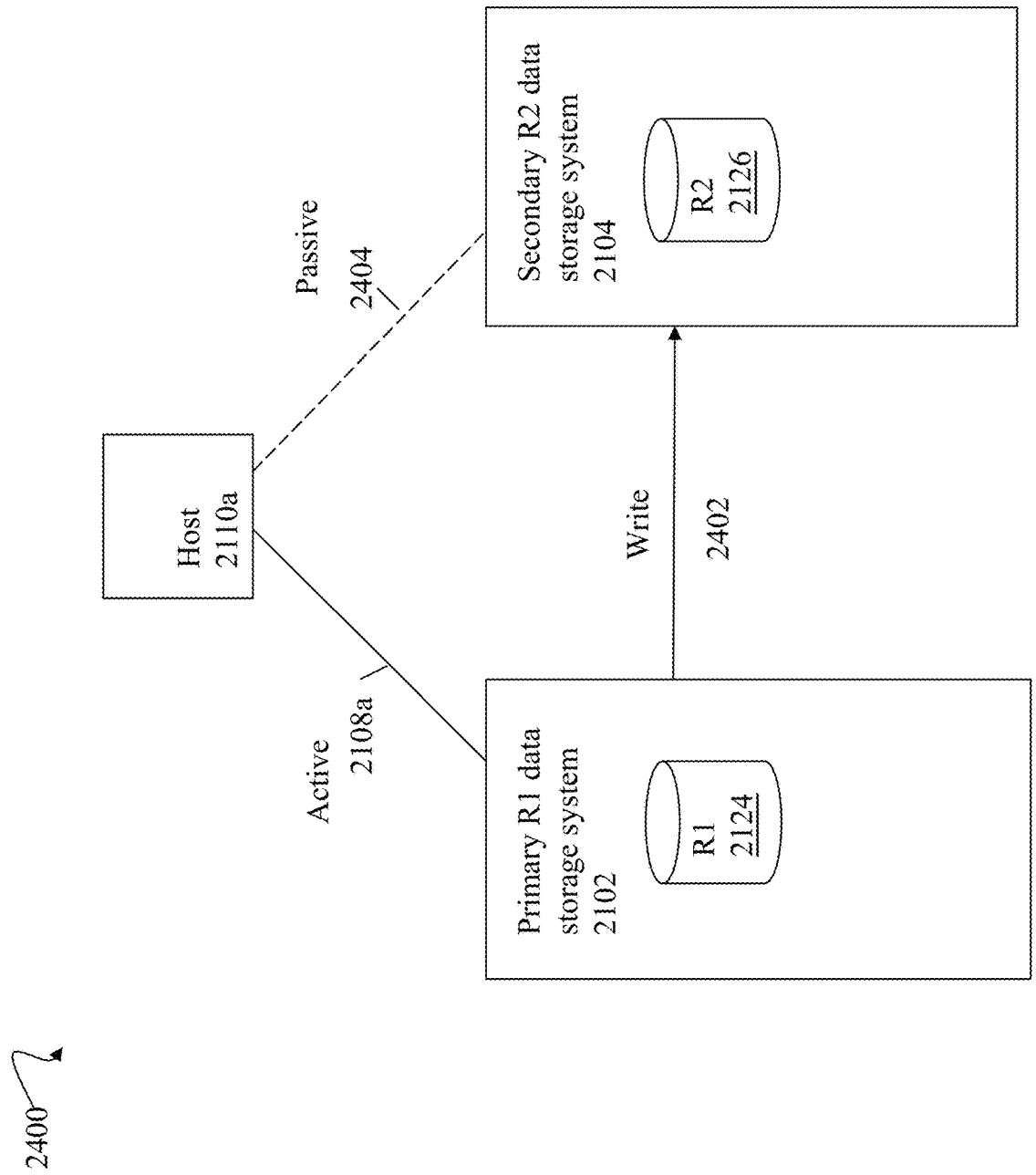
FIG. 4 is an example illustrating an active-passive replication arrangement.

With reference to FIG. 4, shown is a further simplified illustration of components that may be used in in connection with remote replication. The example 2400 is simplified illustration of components as described in connection with FIG. 2. The element 2402 generally represents the replication link used in connection with sending write data from the primary R1 data storage system 2102 to the secondary R2 data storage system 2104. The link 2402, more generally, may also be used in connection with other information and communications exchanged between the systems 2101 and 2104 for replication. As mentioned above, when operating in synchronous replication mode, host 2110a issues a write, or more generally, all I/Os including reads and writes, over a path to only the primary R1 data storage system 2102. The host 2110a does not issue I/Os directly to the R2 data storage system 2104. The configuration of FIG. 4 may also be referred to herein as an active-passive configuration such as may be used with synchronous replication and other supported replication modes where the host 2110a has an active connection or path 2108a over which all I/Os are issued to only the R1 data storage system. The host 2110a may have a passive connection or path 2404 to the R2 data storage system 2104.

In the configuration of 2400, the R1 device 2124 and R2 device 2126 may be configured and identified as the same LUN, such as LUN A, to the host 2110a. Thus, the host 2110a may view 2108a and 2404 as two paths to the same LUN A, where path 2108a is active (over which I/Os may be issued to LUN A) and where path 2404 is passive (over which no I/Os to the LUN A may be issued). For example, the devices 2124 and 2126 may be configured to have the same logical device identifier such as the same world wide name (WWN) or other identifier as well as having other attributes or properties that are the same. Should the connection 2108a and/or the R1 data storage system 2102 experience a failure or disaster whereby access to R1 2124 configured as LUN A is unavailable, processing may be performed on the host 2110a to modify the state of path 2404 to active and commence issuing I/Os to the R2 device configured as LUN A. In this manner, the R2 device 2126 configured as LUN A may be used as a backup accessible to the host 2110a for servicing I/Os upon failure of the R1 device 2124 configured as LUN A.

The pair of devices or volumes including the R1 device 2124 and the R2 device 2126 may be configured as the same single volume or LUN, such as LUN A. In connection with discussion herein, the LUN A configured and exposed to the host may also be referred to as a stretched volume or device, where the pair of devices or volumes (R1 device 2124, R2 device 2126) is configured to expose the two different devices or volumes on two different data storage systems to a host as the same single volume or LUN. Thus, from the view of the host 2110*a*, the same LUN A is exposed over the two paths 2108*a* and 2404.

It should be noted although only a single replication link 2402 is illustrated, more generally any number of replication links may be used in connection with replicating data from systems 2102 to system 2104.

Figure 5:
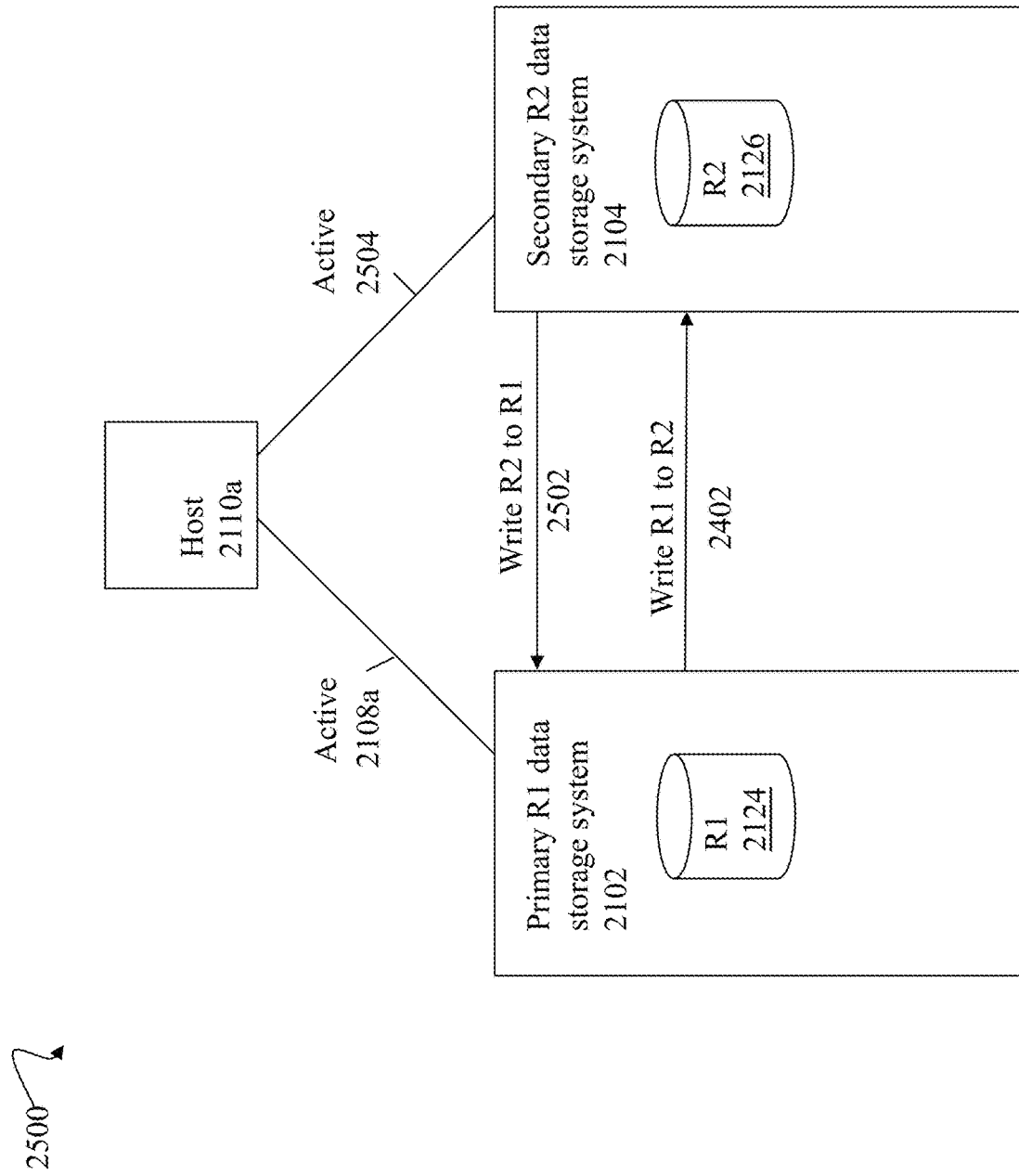
FIG. 5 is an example illustrating an active-active arrangement with a stretched volume in an embodiment in accordance with the techniques herein.

Referring to FIG. 5, shown is an example configuration of components that may be used in an embodiment in accordance with the techniques herein. The example 2500 illustrates an active-active configuration as may be used in connection with synchronous replication in at least one embodiment in accordance with the techniques herein. In the active-active configuration with synchronous replication, the host 2110*a* may have a first active path 2108*a* to the R1 data storage system and R1 device 2124 configured as LUN A. Additionally, the host 2110*a* may have a second active path 2504 to the R2 data storage system and the R2 device 2126 configured as the same LUN A. From the view of the host 2110*a*, the paths 2108*a* and 2504 appear as 2 paths to the same LUN A as described in connection with FIG. 4 with the difference that the host in the example 2500 configuration may issue I/Os, both reads and/or writes, over both of the paths 2108*a* and 2504 at the same time. The host 2110*a* may send a first write over the path 2108*a* which is received by the R1 system 2102 and written to the cache of the R1 system 2102 where, at a later point in time, the first write is destaged from the cache of the R1 system 2102 to physical storage provisioned for the R1 device 2124 configured as the LUN A. The R1 system 2102 also sends the first write to the R2 system 2104 over the link 2402 where the first write is written to the cache of the R2 system 2104, where, at a later point in time, the first write is destaged from the cache of the R2 system 2104 to physical storage provisioned for the R2 device 2126 configured as the LUN A. Once the first write is written to the cache of the R2 system 2104, the R2 system 2104 sends an acknowledgement over the link 2402 to the R1 system 2102 that it has completed the first write. The R1 system 2102 receives the acknowledgement from the R2 system 2104 and then returns an acknowledgement to the host 2110*a* over the path 2108*a*, where the acknowledgement indicates to the host that the first write has completed.

The host 2110*a* may also send a second write over the path 2504 which is received by the R2 system 2104 and written to the cache of the R2 system 2104 where, at a later point in time, the second write is destaged from the cache of the R2 system 2104 to physical storage provisioned for the R2 device 2126 configured as the LUN A. The R2 system 2104 also sends the second write to the R1 system 2102 over a second link 2502 where the second write is written to the cache of the R1 system 2102, and where, at a later point in time, the second write is destaged from the cache of the R1 system 2102 to physical storage provisioned for the R1 device 2124 configured as the LUN A. Once the second write is written to the cache of the R1 system 2102, the R1 system 2102 sends an acknowledgement over the link 2502 to the R2 system 2104 that it has completed the second write. Once the R2 system 2104 receives the acknowledgement from the R1 system (regarding completion of the second write), the R2 system 2104 then returns an acknowledgement to the host 2110*a* over the path 2504 that the second write has completed.

As discussed in connection with FIG. 4, the FIG. 5 also includes the pair of devices or volumes—the R1 device 2124 and the R2 device 2126—configured as the same single stretched volume, the LUN A. From the view of the host 2110*a*, the same stretched LUN A is exposed over the two active paths 2504 and 2108*a*.

In the example 2500, the illustrated active-active configuration includes the stretched LUN A configured from the device or volume pair (R1 2124, R2 2126), where the device or object pair (R1 2124, R2, 2126) is further configured for synchronous replication from the system 2102 to the system 2104, and also configured for synchronous replication from the system 2104 to the system 2102. In particular, the stretched LUN A is configured for dual, bi-directional or two way synchronous remote replication: synchronous remote replication of writes from R1 2124 to R2 2126, and synchronous remote replication of writes from R2 2126 to R1 2124. To further illustrate synchronous remote replication from the system 2102 to the system 2104 for the stretched LUN A, a write to the stretched LUN A sent over 2108*a* to the system 2102 is stored on the R1 device 2124 and also transmitted to the system 2104 over 2402. The write sent over 2402 to system 2104 is stored on the R2 device 2126. Such replication is performed synchronously in that the received host write sent over 2108*a* to the data storage system 2102 is not acknowledged as successfully completed to the host 2110*a* unless and until the write data has been stored in caches of both the systems 2102 and 2104.

In a similar manner, the illustrated active-active configuration of the example 2500 provides for synchronous replication from the system 2104 to the system 2102, where writes to the LUN A sent over the path 2504 to system 2104 are stored on the device 2126 and also transmitted to the system 2102 over the connection 2502. The write sent over 2502 is stored on the R2 device 2124. Such replication is performed synchronously in that the acknowledgement to the host write sent over 2504 is not acknowledged as successfully completed unless and until the write data has been stored in the caches of both the systems 2102 and 2104.

It should be noted that although FIG. 5 illustrates for simplicity a single host accessing both the R1 device 2124 and R2 device 2126, any number of hosts may access one or both of the R1 device 2124 and the R2 device 2126.

Although only a single link 2402 is illustrated in connection with replicating data from systems 2102 to system 2104 in connection with techniques herein, more generally any number of links may be used. Although only a single link 2502 is illustrated in connection with replicating data from systems 2104 to system 2102, more generally any number of links may be used. Furthermore, although 2 links 2402 and 2502 are illustrated, in at least one embodiment, a single link may be used in connection with sending data from system 2102 to 2104, and also from 2104 to 2102.

FIG. 5 illustrates an active-active remote replication configuration for the stretched LUN A. The stretched LUN A is exposed to the host by having each volume or device of the device pair (R1 device 2124, R2 device 2126) configured and presented to the host as the same volume or LUN A. Additionally, the stretched LUN A is configured for two way synchronous remote replication between the two devices or volumes of the device pair.

In an embodiment described herein, the data storage system may be a SCSI-based system such as SCSI-based data storage array. An embodiment in accordance with the techniques herein may include hosts and data storage systems which operate in accordance with the standard SCSI Asymmetrical Logical Unit Access (ALUA). The ALUA standard specifies a mechanism for asymmetric or symmetric access of a logical unit or LUN as used herein. ALUA allows the data storage system to set a LUN's access state with respect to a particular initiator port and the target port. Thus, in accordance with the ALUA standard, various access states may be associated with a path with respect to a particular device, such as a LUN. In particular, the ALUA standard defines such access states including the active-optimized, active-non optimized, and unavailable states as described herein. The ALUA standard also defines other access states, such as standby and in-transition or transitioning (i.e., denoting that a particular path is in the process of transitioning between states for a particular LUN). A recognized path (such as recognized by a host as a result of discovery processing) over which I/Os (e.g., read and write I/Os) may be issued to access data of a LUN may have an "active" state, such as active-optimized or active-non-optimized. Active-optimized is an active path to a LUN that is preferred over any other path for the LUN having an "active-non optimized" state. A path for a particular LUN having the active-optimized path state may also be referred to herein as an optimized or preferred path for the particular LUN. Thus active-optimized denotes a preferred path state for the particular LUN. A path for a particular LUN having the active-non optimized (or unoptimized) path state may also be referred to herein as a non-optimized or non-preferred path for the particular LUN. Thus active-non-optimized denotes a non-preferred path state with respect to the particular LUN. Generally, I/Os directed to a LUN that are sent by the host to the data storage system over active-optimized and active-non optimized paths are processed by the data storage system. However, the host may select to send I/Os to a LUN from those paths having an active-optimized state for the LUN. The host may proceed to use a path having an active non-optimized state for the LUN only if there is no active-optimized path for the LUN. A recognized path over which I/Os may not be issued to access data of a LUN may have an "unavailable" state. When a path to a LUN is in the unavailable state, a limited set of non-I/O-based commands (e.g. other than read and write commands to, respectively, read and write user data), such as the SCSI INQUIRY, may be issued. It should be noted that such limited set of non I/O based commands may also be issued over an active (e.g., active optimized and active non-optimized) path as well.

Figure 6:
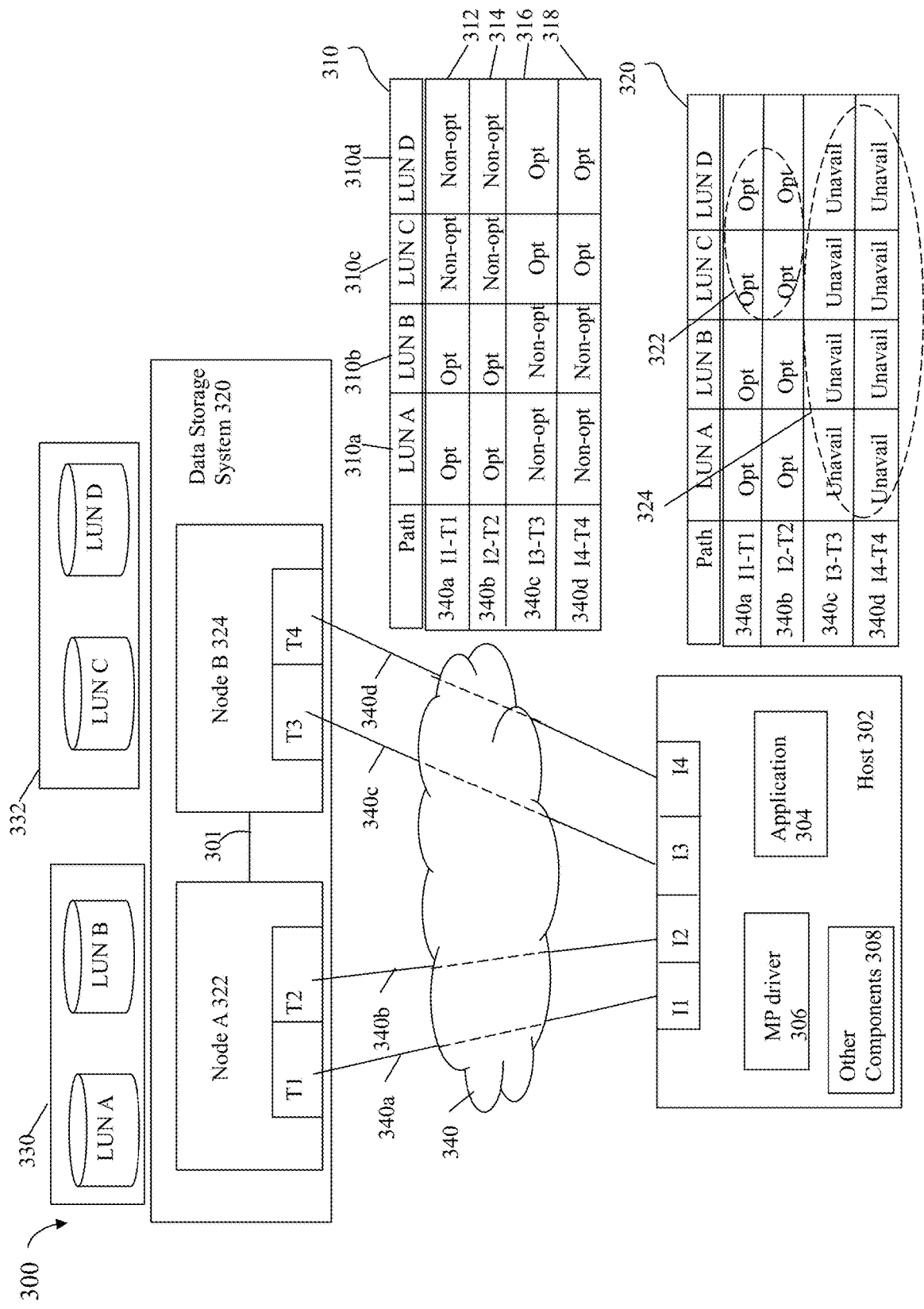
FIG. 6 is an example illustrating path states for paths between a host and a data storage system that may be used in an embodiment in accordance with the techniques herein.

Referring to FIG. 6, shown is an example of an embodiment of a system that may be utilized in connection with the techniques herein. The example 300 includes a host 302, a network 340 and a data storage system 320. The host 302 and the data storage system 320 may communicate over one or more paths 340a-d through the network 340. The paths 340a-d are described in more detail below. The LUNs A and B are included in the set 330, and the LUNs C and D are included in the set 332. The LUNs of the sets 330 and 332 are configured from non-volatile BE storage PDs of the data storage system 320. The data storage system includes two nodes—node A 322 and node B 324. The nodes 322, 324 may be as described elsewhere herein. The element 301 denotes an internode communication connection similar, for example, to the connection 120 of FIG. 2. Consistent with other discussion herein such as in connection with FIG. 2, the BE PDs from which storage is provisioned for the LUNs of 330, 332 are accessible to both the nodes 322, 324.

The host 202 may include an application 304, a multi-path (MP) driver 306 and other components 308. The other components 308 may include, for example, one or more other device drivers, an operating system, and other code and components of the host. An I/O operation from the application 304 may be communicated to the data storage system 320 using the MP driver 306 and one or more other components of the data path or I/O path. The application 304 may be a database or other application which issues data operations, such as I/O operations, to the data storage system 320. Each of the I/O operations may be directed to a LUN, such as one of the LUNs of 330, 332, configured to be accessible to the host 302 over multiple physical paths. As such, each of the I/O operations may be forwarded from the application 304 to the data storage system 320 over one of the possible multiple paths.

The MP driver 306 may include functionality to perform any one or more different types of processing such as related to multipathing. For example, the MP driver 306 may include multipathing functionality for management and use of multiple paths. For example, the MP driver 306 may perform path selection to select one of the possible multiple paths based on one or more criteria such as load balancing to distribute I/O requests for the target device across available active-optimized or preferred paths. Host side load balancing may be performed by the MP driver to provide for better resource utilization and increased performance of the host, data storage system, and network or other connection infrastructure. The host 302 may also include other components 308 such as one or more other layers of software used in connection with communicating the I/O operation from the host to the data storage system 120. For example, element 108 may include Fibre Channel (FC), SCSI and NVMe (Non-Volatile Memory Express) drivers, a logical volume manager (LVM), and the like. It should be noted that element 308 may include software or other components used when sending an I/O operation from the application 304 where such components include those invoked in the call stack of the data path above the MP driver 306 and also below the MP driver 306. For example, application 304 may issue an I/O operation which is communicated in the call stack including an LVM, the MP driver 306, and a SCSI driver.

The data storage system 320 may include one or more BE PDs configured to store data of one or more LUNs. Each of the LUNs 330, 332 may be configured to be accessible to the host 302 through multiple paths. The node A 322 in this example has two data storage system target ports T1 and T2. The node B 324 in this example has two data storage system target ports T3 and T4. The host 302 includes 4 host initiator ports I1, I2, I3 and I4. The path 340a is formed using the endpoints I1 and T1 and may be denoted as I1-T1. The path 340b is formed using the endpoints I2 and T2 and may be denoted as I2-T2. The path 340c is formed using the endpoints I3 and T3 and may be denoted as I3-T3. The path 340d is formed using the endpoints I4 and T4 and may be denoted as I4-T4.

In this example, all of the LUNs A, B C and D may be accessible or exposed over all the data storage system target ports T1, T2, T3 and T4 over the paths 340a-d. As described in more detail below, a first set of paths to the node A 322 may be specified as active-optimized or preferred for the LUNs of the set 330 and a second set of paths to the node B 324 may be specified as active-optimized or preferred for the LUNs of the set 332. Additionally the first set of paths to the node A 322 may be specified as active-non optimized or non-preferred for the LUNs of the set 332 and the second set of paths to the node B 324 may be specified as active-non optimized or non-preferred for the LUNs of the set 330.

The multiple active paths allow the application I/Os to the LUNs A, B C and D to be routed over the multiple paths 340a-d and, more generally, allow the LUNs A, B C and D to be accessed over the multiple paths 340a-d. In the event that there is a component failure in one of the active-optimized multiple paths for a particular LUN, application I/Os directed to the particular LUN can be easily routed over other alternate preferred paths unaffected by the component failure. Additionally, in the event there are no preferred paths available for issuing I/Os to the particular LUN, non-preferred paths for the particular LUN may be used to send the I/Os to the particular LUN. Thus, an embodiment of the MP driver 306 may also perform other processing in addition to load balancing in connection with path selection. The MP driver 106 may be aware of, and may monitor, all paths between the host and the LUNs A, B C and D in order to determine that particular state of such paths with respect to the various LUNs. In this manner, the MP driver may determine which of the multiple paths over which a LUN is visible may be used for issuing I/O operations successfully. Additionally, the MP driver may use such information to select a path for host-data storage system communications issued to the particular LUN.

In the example 300, each of the LUNs A, B C and D may be exposed through the 4 paths 340a-d. As described in more detail below, each of the paths 340a-d may have an associated ALUA state also used by the host when issuing I/O operations. Each path 340a-d may be represented by two path endpoints—a first endpoint on the host 302 and a second endpoint on the data storage system 320. The first endpoint may correspond to a port of a host component, such as a host bus adapter (HBA) of the host 302, and the second endpoint may correspond to a target port of a data storage system component, such as a target port of a node of the data storage system 320. In the example 300, the elements I1, I2, I3 and I4 each denote a port of the host 302 (e.g. such as a port of an HBA), and the elements T1, T2 T3 and T4 each denote a target port of a node of the data storage system 320.

The MP driver 306, as well as other components of the host 302, may execute in kernel mode or other privileged execution mode. In one embodiment using a Unix-based operating system, the MP driver 306 may execute in kernel mode. In contrast, the application 304 may typically execute in user mode, or more generally, a non-privileged execution mode. Furthermore, it will be appreciated by those skilled in the art that the techniques herein may be used in an embodiment having any one of a variety of different suitable operating systems including a Unix-based operating system as mentioned above, any one of the Microsoft Windows® operating systems, a virtualized environment, such as using the VMware™ ESX hypervisor by VMware, Inc, and the like.

In operation, the application 304 may issue one or more I/O operations (e.g., read and write commands or operations) directed to the LUNs 330, 332 of the data storage system. Such I/O operations from the application 304 may be directed to the MP driver 306 after passing through any intervening layers of the data or I/O path.

In connection with the SCSI standard, a path may be defined between two ports as described above. A command may be sent from the host (as well as a component thereof such as a HBA) and may be characterized as an initiator, originator or source with respect to the foregoing path. The host, as the initiator, sends requests to a data storage system (as well as a particular component thereof such as node having a port with a network address) characterized as a target, destination, receiver, or responder. Each physical connection of a path may be between a first endpoint which is an initiator port (e.g., I1) of the host and a second endpoint (e.g., T1) which is a target port of node in the data storage system. Over each such path, one or more LUNs may be visible or exposed to the host initiator through the target port of the data storage system.

In connection with some protocols such as the SCSI protocol, each path as related to sending and receiving of I/O commands may include 2 endpoints. As discussed herein, the host, or port thereof, may be an initiator with respect to I/Os issued from the host to a target port of the data storage system. In this case, the host and data storage system ports are examples of such endpoints. In the SCSI protocol, communication may be unidirectional in that one of the endpoints, such as the host HBA port, is the initiator and the other endpoint, such as the data storage system target port, is the target receiving the commands from the initiator.

An I/O command or operation, such as a read or write operation, from the host to the data storage system may be directed to a LUN and a logical address or location in the LUN's logical address space. The logical address or location of the LUN may be characterized as the target logical address of the I/O operation. The target logical address or location of the I/O operation may identify a LBA within the defined logical address space of the LUN. The I/O command may include various information such as identify the particular type of I/O command as read or write, identify the target logical address (e.g., LUN and LUN logical address) of the I/O command, and other information. In connection with servicing the I/O operation, the data storage system may map the target logical address to a physical storage location on a PD of the data storage system. The physical storage location may denote the physical storage allocated or provisioned and also mapped to the target logical address.

In an embodiment described herein, the data storage system 320 may be a SCSI-based system such as SCSI-based data storage array operating in accordance with the ALUA standard. As described herein, a data storage system in accordance with techniques herein may set an access path state for a particular LUN over a particular path from an initiator to a target of the data storage system. For example, the data storage system may set an access path state for a particular LUN on a particular path to active-optimized (also referred to herein as simply "optimized" or "preferred") to denote the path as a preferred path for sending I/Os directed to the LUN. The data storage system may set an access path state for a particular LUN on a particular path to active-non optimized (also referred to herein as simply "non-optimized" or "non-preferred") to denote a non-preferred path for sending I/Os directed to the LUN sent. The data storage system may also set the access path state for a particular LUN on a particular path to other suitable access states. Although discussion herein may refer to the data storage system setting and modifying the path access states of the paths between the host and the data storage system, in some embodiments, a host may also set and/or modify the path access states which are then communicated to the data storage system.

In accordance with the techniques herein, the data storage system may set the path state for a particular LUN to preferred or non-preferred for any suitable purpose. In at least one embodiment, multipathing software, such as the MP driver, on the host may monitor the particular access path state as may be set by the data storage system with respect to a particular LUN to determine which path to select for sending I/Os to the LUN. Thus, when the LUN is exposed to a host initiator over multiple paths (e.g., where the same LUN is accessible through multiple different target ports of the data storage system), the data storage system may vary the associated access state of each such path in order to vary and control the particular ones of the multiple paths over which the host may issue I/Os to the LUN.

The element 330 indicates that the LUN A and the LUN B are exposed to the host 302 over preferred paths to the node A 322 and non-preferred paths to the node B 324. The element 332 indicates that the LUN C and the LUN D are exposed to the host 302 over preferred paths to the node B 324 and non-preferred paths to the node A 322. Thus, the paths 340c-d to the target ports T3 and T4 of node B 324 are set to optimized or preferred for the LUNs C and D and set to non-optimized or non-preferred for the remaining LUNs A and B; and the paths 340a-b to the target ports T1 and T2 of node A 322 are set to preferred or optimized for the LUNs A and B and set to non-optimized or non-preferred for the remaining LUNs C and D.

In at least one embodiment, target ports are given identifiers and may be organized into target port groups (TPGs). In at least one embodiment, a TPG may be defined as a logical grouping or collection of one or more target port identifiers that share the same access characteristics for a particular LUN. For example, target ports T1 and T2 may be included in a first TPG and target ports T3 and T4 may be included in a second TPG. With ALUA in at least one embodiment, a LUN may be visible with respect to the entire TPG rather than on a port level basis. In other words, a LUN may be exposed or visible on a TPG level. If the LUN is visible or accessible on a first target port in the first TPG including that first target port, then the LUN is also accessible or visible on all targets ports of the first TPG. Each TPG can take on a state (e.g., preferred or non-preferred). For a given LUN, the LUN is visible on the TPG level basis (e.g. with respect to all target ports of a TPG). Thus the LUN has the same path state or access characteristic with respect to all target ports of the same TPG. For example, the first TPG noted above may include all target ports of one of the nodes such as node A 322 over which the LUNs A, B, C and D are exposed; and the second TPG noted above may include all target ports of one of the nodes such as node B 324 over which the LUNs A, B, C and D are exposed.

The table 310 denotes the different path states for each of the 4 paths for the 4 LUNs A, B, C and D. The table 310 reflects the path states as discussed above. The row 312 indicates that path I1-T1 including the target port T1 of node A 322 is active optimized (opt) or preferred for the LUNs A and B and active non-optimized (non-opt) or non-preferred for the LUNs C and D. The row 314 indicates that path I2-T2 including the target port T2 of node A 322 is optimized (opt) or preferred for the LUNs A and B and non-optimized (non-opt) or non-preferred for the LUNs C and D. The row 316 indicates that path I3-T3 including the target port T3 of node B 324 is optimized (opt) or preferred for the LUNs C and D and non-optimized (non-opt) or non-preferred for the LUNs A and B. The row 318 indicates that path I4-T4 including the target port T4 of node B 324 is optimized (opt) or preferred for the LUNs C and D and non-optimized (non-opt) or non-preferred for the LUNs A and B.

Assume further, for example, the node B 324 of the data storage system 320 now experiences a failure so that the target ports T3 and T4 and thus the paths 340c, 340d are unavailable. In response to the failure of the node B 324 and the target ports T3 and T4, the path states may be updated from the states of the table 310 to the revised path states of the table 320. In the table 320, due to the failure and unavailability of the paths 340c-d, 1) the path states of 322 indicate that the path 340a I1-T1 and the path 340b I2-T2 have transitioned from the non-optimized to the optimized or preferred path state for the LUNs C and D; and 2) the path states of 324 indicate that the path I3-T3 340c and the path 340d I4-T4 for the LUNs A, B, C and D have transitioned to the unavailable state.

It is noted that other embodiments may have different path state changes than as denoted by the table 320.

A metro cluster configuration may be used herein to refer to a configuration including two data storage systems respectively configured with two devices or volumes with the same identity that cooperate to expose a stretched volume or LUN, such as in the FIGS. 4 and 5, to one or more hosts. In the metro cluster configuration, the hosts and applications running on the hosts perceive the two devices or volumes configured to have the same identity as the single stretched volume, device or LUN.

In a metro cluster configuration, each of the two data storage systems may be in different data centers or may be in two server rooms or different physical locations within the same data center. The metro cluster configuration may be used in a variety of different use cases such as, for example, increased availability and disaster avoidance and DR, resource balancing across data centers and data storage systems, and storage migration.

In a metro cluster configuration, hosts may be configured with uniform host connectivity as illustrated in FIGS. 4 and 5, where a host may be connected to both data storage systems exposing the pair of devices or volumes configured as the same stretched volume or LUN, such as the LUN A described in connection with FIG. 5. From the perspective of the host 2110a of FIG. 5, the data storage system 2102 may be a local data storage system included in the same data center as the host 2110a, and the data storage system 2104 may be a remote data storage system. Thus the host 2110a is configured with uniform host connectivity. In contrast to uniform host connectivity is non-uniform host connectivity, where the host is only connected to the local data storage system but not the remote data storage system of the metro cluster configuration.

Figure 7A:
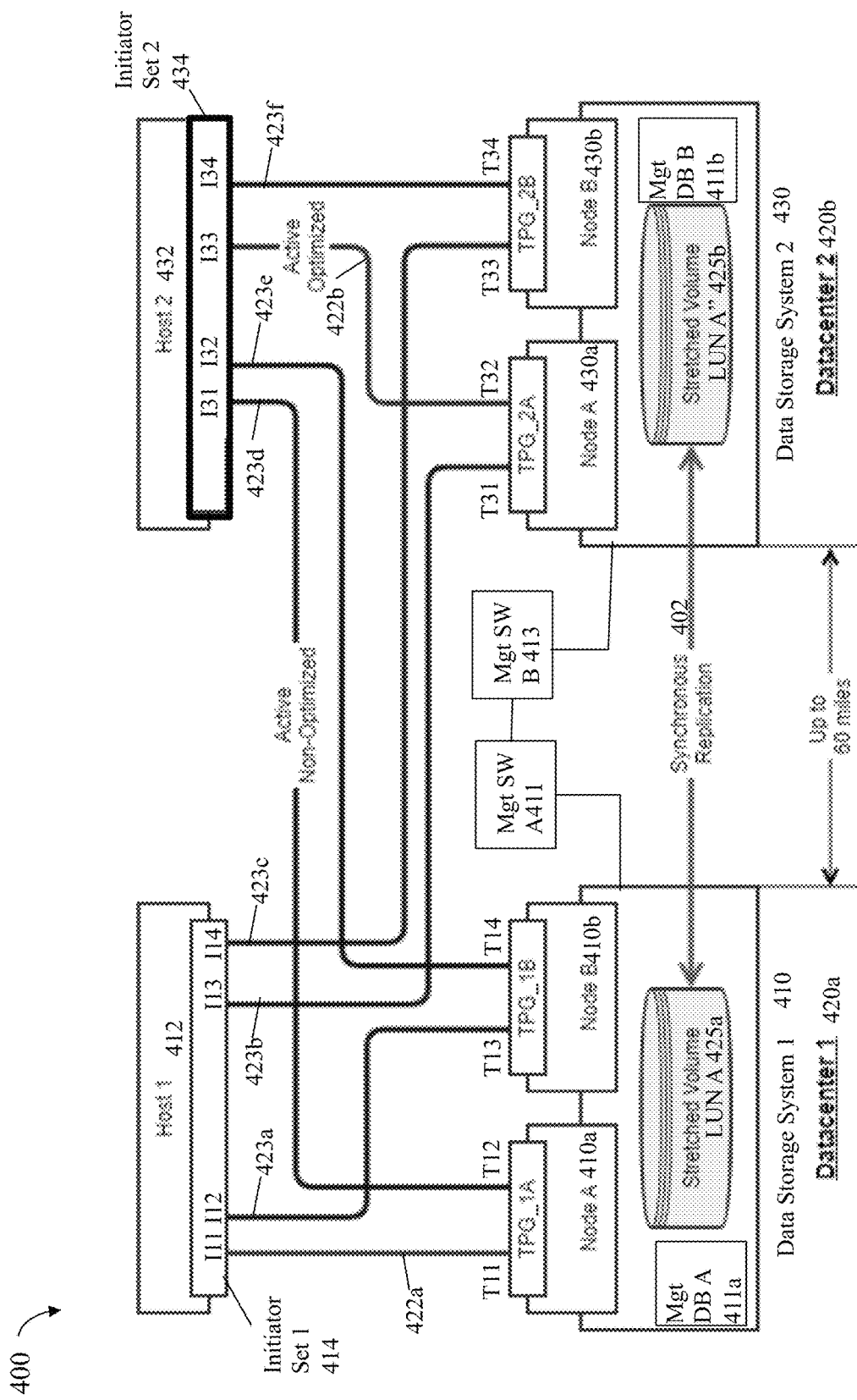
FIGS. 7A and 7B are examples illustrating path states for paths between multiple data storage systems and multiple hosts in a metro cluster configuration with a stretched volume in embodiments in accordance with the techniques herein.

Referring to FIG. 7A, shown is a more detailed illustration of a metro cluster configuration. The example 400 includes a stretched volume or LUN A and two hosts configured 412, 414 with uniform host connectivity in at least one embodiment in accordance with the techniques herein.

In the FIG. 7A, the host 1 412 and the data storage system 1 410 are in the data center 1 420a. The host 2 414 and the data storage system 2 430 are in the data center 2 420b. The host 1 412 includes the initiators I11-I14. The host 432 includes the initiators I31-I34. The data storage systems 410, 430 may be dual node data storage systems such as described elsewhere herein (e.g., FIG. 2). The data storage system 410 includes the node A 410a with the target ports T11-T12, and the node B 410b with the target ports T13-T14. The data storage system 430 includes the node A 430a with the target ports T31-T32, and the node B 430b with the target ports T33-T34. From the perspective of host 1 412, the data storage system 1 410 and data center 1 420a may be characterized as local, and the data storage system 2 430 and the data center 2 420b may be characterized as remote. From the perspective of host 2 432, the data storage system 1 410 and data center 1 420a may be characterized as remote, and the data storage system 2 430 and the data center 2 420b may be characterized as local.

As illustrated in the FIG. 7A, the stretched volume or LUN A is configured from the device or volume pair LUN A 425a and LUN A" 425b, where both the LUNs or volumes 425a-b are configured to have the same identity from the perspective of the hosts 412, 432. The LUN A 425a and the LUN A" 425*b* are configured for two way synchronous remote replication 402 which, consistent with other description herein, provides for automated synchronous replication of writes of the LUN A 425*a* to the LUN A" 425*b*, and also automated synchronous replication of writes of the LUN A" 425*b* to the LUN A 425*a*. The LUN A 425*a* may be exposed to the hosts 412, 432 over the target ports T11-T14 of the system 410, and the LUN A" 425*b* may be exposed to the hosts 412, 432 over the target ports T31-T34.

In at least one embodiment in which the arrangement of FIG. 7A is in accordance with the ALUA protocol, the paths 423*a-f* may be configured with the path state of active non-optimized and the paths 422*a-b* may be configured with the path state of active optimized. Thus, the host 412 has uniform host connectivity to the stretched volume or LUN A by the active connections or paths 422*a* (I11-T11), 423*a* (I12-T13) to the data storage system 410 exposing the LUN A 425*a*, and the active connections or paths 423*b* (I13-T31), 423*c* (I14-T33) to the data storage system 430 exposing the LUN A" 425*b*. The host 432 has uniform host connectivity to the stretched volume or LUN A by the active connections or paths 423*d* (I31-T12), 423*e* (I32-T14) to the data storage system 410 exposing the LUN A 425*a*, and the active connections or paths 422*b* (I33-T32), 423*f* (I34-T34) to the data storage system 430 exposing the LUN A" 425*b*.

Uniform host connectivity deployments such as illustrated in FIG. 7A offer high resiliency to failure of any local component or cross data center connection. Failures such as a total loss of a local storage system (that is local from a host's perspective) result in the host performing I/Os using the cross-datacenter links to the remote data storage system, which results in increased latency but does not require immediate application restart since I/Os issued from the host are still serviced using the remote data storage system. FIG. 7A illustrates a configuration that may also be referred to as a metro cluster configuration with a pair of data storage systems 410, 430. With respect to a host, such as the host 412, one of the data storage systems, such as the system 410, may be local and in the same data center as the host, and the other remaining data storage system, such as the system 430, may be remote and in a different location or data center than the host 412.

To further illustrate, the FIG. 7A may denote the path states at a first point in time T1. At a second point in time T2 subsequent to T1 and illustrated in the FIG. 7B, the data storage system 2 430 may experience a failure or disaster where the LUN A" 425*b* on data storage on the system 430 is unavailable and cannot be accessed through the target ports T31-34. In response to the unavailability of the data storage system 430, the host 2 432 uses the path 454*b* to issue I/Os to the LUN A 425*a* on the data storage system 410. Thus, failure of the system 430 that is local to the host 432 results in the host 432 performing I/Os using the cross-data center link 454*b* to the remote system 410 which results in increased latency but does not require immediate application restart since I/Os issued by the application 3 (app 3) on the host 432 may still be serviced using the remote system 410.

In response to the unavailability of the data storage system 430, the paths 452*a-d* to the system 430 transition to the unavailable path state, the path 454*a* remains active optimized, the path 454*b* transitions from active non-optimized to active optimized, and the remaining paths 456*a-b* remain active non-optimized.

By default, data storage systems may not allow any connected host to access any available LUN or volume. More generally, the data storage system may use an access control mechanism to permit or allow access to data storage system resources. The access control mechanism may be exposed for use by a data storage administrator on the control or management path. In at least one embodiment, one or more interfaces on the control path may be used to specify which volumes or LUNs may be accessed by which particular host(s). For example, the GUI of a data storage management application and/or a command line interface (CLI) may be used to specify which LUNs may be accessed by a particular host.

Figure 7B:
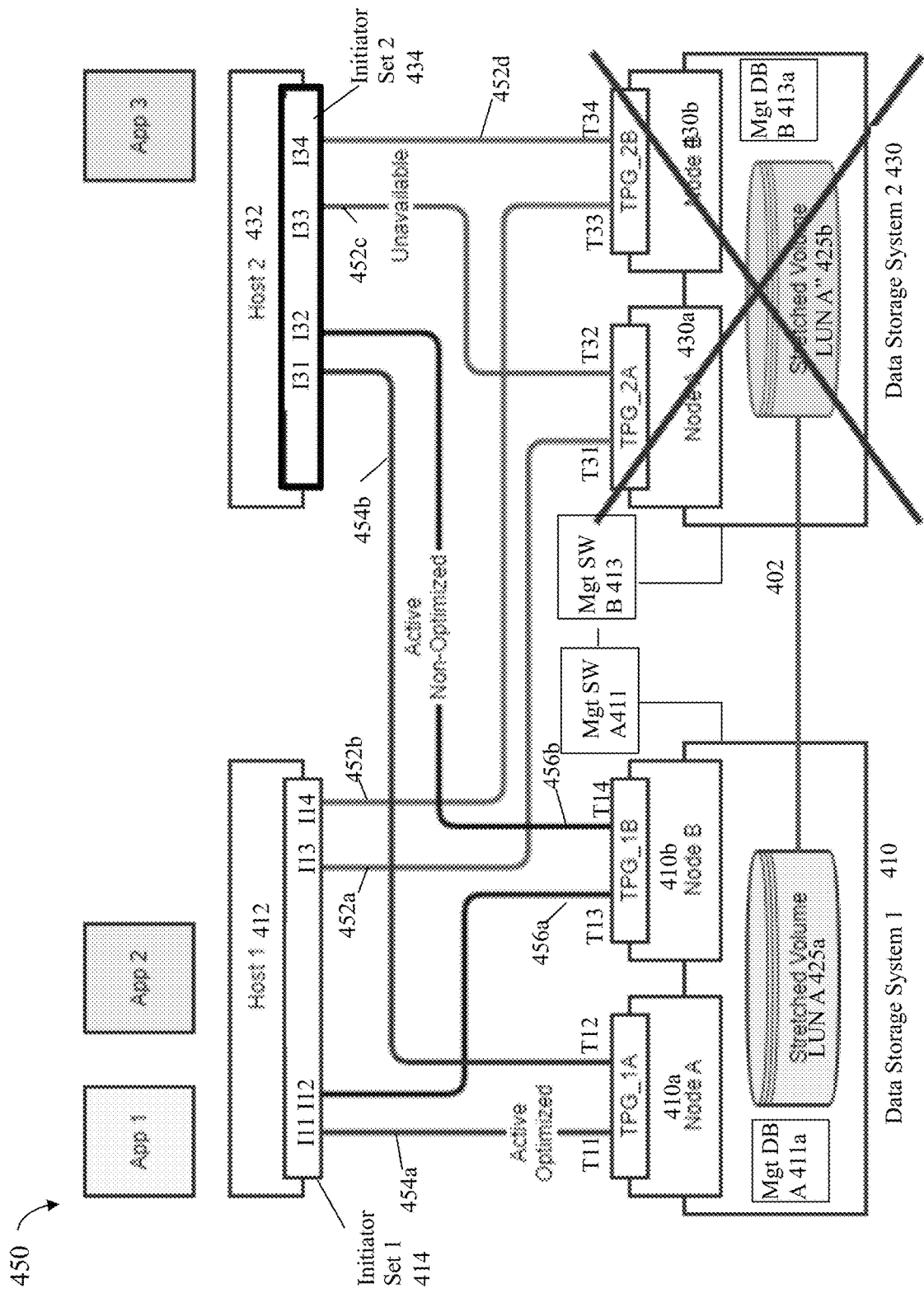

A user, such as a data storage administrator, may manually perform the necessary configurations of the access control mechanisms on the two data storage systems 410, 430 to provide the hosts 412, 432 with the uniform host connectivity as illustrated in the FIG. 7A and FIG. 7B. However, performing such manual configurations on both data storage systems may be inefficient and error prone.

Accordingly, described in the following paragraphs are techniques that may be used to efficiently automate uniform host connectivity configuration used with a stretched volume or LUN in a metro cluster configuration.

In the following paragraphs, the techniques herein may refer to a SCSI based protocol, such as FC or iSCSI. However, the metro cluster configuration, stretched volume, and the techniques described in the following paragraphs may also be used in embodiments using other suitable protocols, such as, for example, NVMe.

In at least one embodiment in accordance with the techniques herein, a host object may be used as an access control mechanism to allow a particular host to access particular LUNs or volumes on the data storage system. A host object may be created and used to uniquely represent a host. The host object representing the host may include a name of the host object, an operating system type (e.g., Windows Server 2012, Windows Server 2016, Linux) regarding the operating system on the host, and a set of one or more SCSI initiators of the host. In at least one embodiment, the initiators of the host object may be discovered by a data storage system based on initiators that have logged into target ports of the data storage system, or may be added manually by an administrator. Storage volumes or LUNs, including stretched volumes or LUNs, may be mapped to the host object to denote that the host represented by the host object has access to the mapped volumes or LUNs. When a volume or LUN is mapped to the host object representing the host, the host is allowed access to the volume or LUN including, for example, issuing I/Os to the mapped volume or LUN. Additionally, the host represented by the host object is allowed to access the mapped volume or LUN over paths including an initiator from an initiator set of the host object. The initiator set generally includes one or more initiators of the host represented by the host object. The initiator set is discussed in more detail elsewhere herein.

In at least one embodiment and with reference to FIG. 7A, to grant the host 1 412 access to the stretched volume or LUN A, processing may be performed to configure a first host object on the data storage system 410 and a second host object on the data storage system 430, where the foregoing first and second host objects represent the host 1 412. In at least one embodiment, the set of initiators of a host object may be used to uniquely identify the host. The set of initiators may be unique to each particular host since each initiator has a unique identifier (ID). For example, in an embodiment using FC, each of the initiators of the host may be uniquely identified by a world wide name (WWN). As another example in an embodiment using iSCSI, each of the initiators of the host may be uniquely identified by an IQN (iSCSI qualified name). Thus, the initiators I1-I4 of the initiator set 1 414 may be included in the first and the second host objects, respectively, for the systems 410, 430, where the initiator set 1 414 may be used to uniquely identify the host 1 412. In at least one embodiment, the set of initiators of the first and second host objects representing the same host 1 412 may be identical and used to determine whether the first and the second host objects represent the same host 412. In such an embodiment, if two sets of initiators, respectively, of two host objects match, the two host objects are determined to represent the same host, and otherwise may be determined not to represent the same host.

In one embodiment, the two host objects may be determined as representing the same host only if their respective sets of initiators are identical. In some embodiments, other information of the two host objects representing the same host may have identical initiator sets but may have one or more other items of different information. For example, the first host object on a first data storage system may have a first name and a first initiator set, and the second host object on a second data storage system may have a second name (different from the first name) and the first initiator set. In at least one embodiment, the foregoing first and second host objects may be determined, due to the identical first initiator set in both host objects, to represent the same host despite the different names of the two host objects.

In at least one embodiment, connectivity from a host to a data storage system may be specified using an initiator set included in a host object for the host. For a volume or LUN mapped to the host object having the initiator set, the volume or LUN is accessible to the host over paths including an initiator from the initiator set.

In at least one embodiment, a first level of automation may be provided. The first level of automation may also be referred to herein as configuration validation. With configuration validation, a user such as a storage administrator may configure the first host object on the first data storage system using a first management software application for the first data storage system, and may configure the second host object on the second data storage system using a second management software application for the second data storage system. Subsequently, the first and the second management software applications may communicate with one another and processing may be performed to ensure that the user configured first and second host objects are correctly configured to represent the same host. For example, the processing may include comparing the first and second host objects. An assumption may be that an initiator set of a host object may be used to uniquely identify a particular host, where a correctly defined configuration is therefore defined by the first and the second host objects having the same matching identical initiator sets.

With reference to FIGS. 7A and 7B, the element 411 denotes the data storage system management software application A for the system 410, and the element 413 denotes the data storage system management application B for the system 430. The management applications 411 and 413 may communicate with one another through a network or other suitable communication connection in connection with performing the processing needed for the techniques described herein. The element 411a represents the management database (DB) A that stores management and other information used by the management application A 411 for the system 410. For example, host objects created using the management application A 411 for the system 410 may be stored in the management DB A 411a. The element 413a represents the management DB B that stores management and other information used by the management application B 413 for the system 430. For example, host objects created using the management application B 413 for the system 430 may be stored in the management DB B 413a.

In at least one embodiment, with data storage system management software communicating over a network in a metro cluster, when a storage administrator configures a first host object, such as for the host 1 412 on the data storage system 1 410, the management software 411 of the system 410 may determine whether there is another second host object configured on the other storage system 430, where the second host object on the system 430 uses at least one initiator of the first host object being configured on the system 410 for the host 1 412. If there is such a second host object, then the second host object shall have exactly the same initiator set as the first host object since both the first and second host objects represent the same physical host 1 412. Based on the foregoing, the data storage system management software may notify the storage administrator of any detected incorrect or inconsistent configuration with respect to the first and second host objects. For example, processing may be performed to compare the initiator sets of the first and the second host objects to determine whether there is only a partial overlap or intersection between the initiator sets of the two host objects. If it is determined that there is only a partial overlap between the initiator sets rather than an identical match, the management software may notify the administrator who may be currently configuring the first host object. In such an embodiment, if the first host object on the first system 410 and the second host object on the second system 430 include one or more matching initiators, then it is assumed that the first and second host objects refer to the same host. Additionally, further checking may be performed to ensure that the initiator sets of both the first and second host objects match and are identical. An initiator set of the first host object and another initiator set of the second host object may be determined as identical or matching if both initiator sets include the same initiators both in terms of initiator IDs and number of initiators in each set.

In at least one embodiment, to reduce the number of host objects that are examined to determine whether there is any overlap or intersections in initiator set, host objects that are to be scanned and processed in connection with the configuration validation processing may be specifically marked with an indication and only such host objects that are so marked are considered for configuration validation processing. For example, in at least one embodiment, a user creating a host object may mark the host object with a property or attribute such as "stretched" to denote that the host object is to be considered for configuration validation processing. In such an embodiment, any host object not marked with the stretched attribute or property is omitted and not considered when performing processing for configuration validation. In at least one embodiment, the stretched attribute may be specified when creating a host object. The stretched attribute may be subsequently modified along with other permissible modifications made to an existing host object. Generally, the stretched attribute may indicate whether or not the host object is for a "stretched" host that will use a stretched volume or LUN with uniform host connectivity as discussed elsewhere herein. The stretched host is configured to access both the local data storage system and a remote data storage system of the metro cluster. For example, with reference to FIG. 7A when creating a host object 1 for the host 1 412, an attribute or property may be set to uniform to indicate that the host object 1 is for the host 1 412 configured with remote access to LUNs or volumes of the remote data storage system 430 as well as with local access to LUNs or volumes of the local data storage system 410. In particular, selecting or setting the "stretched" attribute of the host object indicates that the represented host is configured to have uniform access in a metro configuration using one or more stretched volumes or LUNs.

Figure 8:
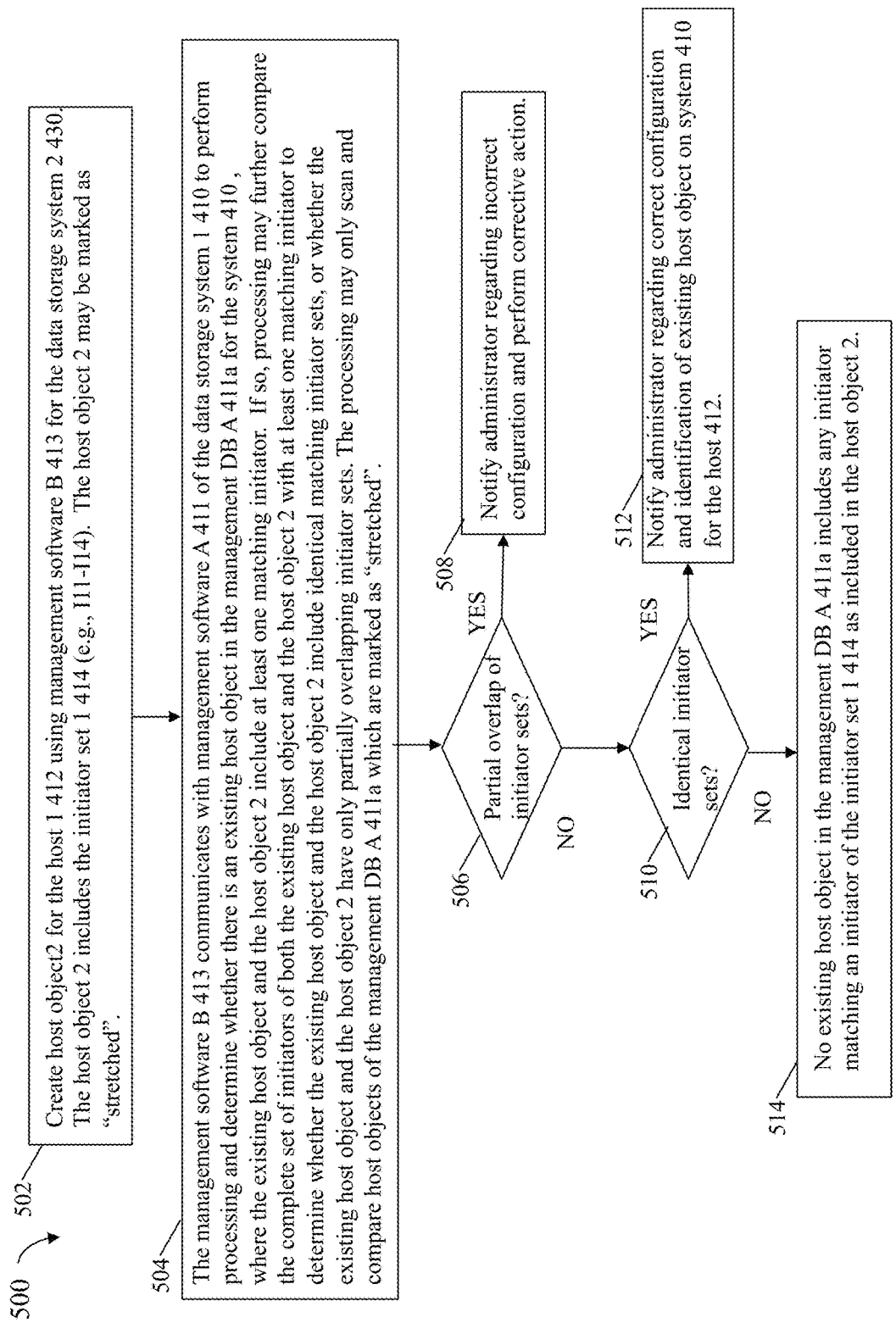
FIGS. 8, 9 and 10 are flowcharts of processing steps that may be performed in an embodiment in accordance with the techniques herein.

Referring to FIG. 8, shown is a flowchart 500 of processing steps that may be performed in an embodiment in accordance with the techniques herein for configuration validation processing described above.

The flowchart 500 is described with reference to the components of FIGS. 7A and 7B when creating a host object 2 for the host 1 412 using the management software B 413 for the data storage system 2 430. However, more generally, the processing of FIG. 8 may be performed when creating a host object representing any host in any data storage system of the metro cluster.

At a step 502, processing may be performed to the host object 2 for the host 1 412 using management software B 413 for the data storage system 2 430. The host object 2 includes the initiator set 1 414 (e.g., I11-I14). The host object 2 may be marked as "stretched". From the step 502, control proceeds to a step 504. The host object 2 is stored in the management DB 413a.

At the step 504, the management software B 413 communicates with the management software A 411 of the data storage system 1 410 to perform processing and determine whether there is an existing host object in the management DB A 411a for the system 410, where the existing host object and the host object 2 include at least one matching initiator. If so, processing may further compare the complete set of initiators of both the existing host object and the host object 2 with at least one matching initiator to determine whether the existing host object and the host object 2 include identical matching initiator sets, or whether the existing host object and the host object 2 have only partially overlapping initiator sets. The processing may only scan and compare host objects of the management DB A 411a which are marked as "stretched". It should be noted that the partially overlapping initiator sets are not identical but rather includes at least one matching initiator. From the step 504, control proceeds to a step 506.

At the step 506, a determination is made as to whether an existing host object of the management DB A 411a has been identified in the step 504, where the existing host object includes only a partial overlap of initiator sets with the host object 2. More generally, the step 506 evaluates to yes if there is any difference in initiator sets of the host object 2 and the existing host object of the management BD A 411a. For example, the host object 2 includes the initiator set 1 414 with I11-I14. If an existing host object in the management DB A 411a includes an initiator set with only I11 and I12, then a partial overlap between the initiator sets of the host object 2 and the existing host object is determined. If the step 506 evaluates yes, control proceeds to a step 508. At the step 508, processing may be performed to notify the administrator or user, such as the user creating the object 2 in the step 502, regarding an incorrect configuration of host objects for the host 1 412. In particular, the notification may indicate that the existing host object for the host 1 412 was located in the management DB A 411a of the system 410 where the existing host object includes an initiator set is not identical to the initiator set 1 of the host object 2 created for the host 1 412. The notification may further indicate that the existing host object only includes some of the same initiators as the host object 2 and may identify the differences between the host object 2 and the existing host object. For example, the notification may indicate that the existing host object includes only I1 and I2 and is therefore missing the initiators I3 and I4 which are also included in the host object 2.

The step 508 may also include taking a corrective action. The corrective action may be performed automatically without requiring confirmation from a user. As a variation, the corrective action may be performed automatically after receiving user confirmation to proceed with the corrective action. The corrective action may be any suitable action. In at least one embodiment, the corrective action may include updating one or both of the existing host object in the management DB A 411a and the host object 2 stored in the management DB B 413a. For example, assume as discussed above that the existing host object in the management DB 411a includes only the initiators I11 and I12. The corrective action may be to update the initiator set of the existing host object to additionally include I3 and I4 thereby resulting in the host object 2 and the existing host object having identical initiator sets. The initiators added to the existing host object may be those determined based on the comparison and difference detected in connection with the step 504 processing. As a variation, the corrective action may allow a user to provide input and specify what updates should be made to one or both of the existing host object and the host object 2.

If the step 506 evaluates to no, control proceeds to a step 510. At the step 510, a determination is made as to whether the processing of the step 504 located an existing host object in the management DB 411a with an initiator set that is identical to the initiator set 1 414 of the host object 2 stored in the management DB 413a. If the step 510 evaluates to yes, control proceeds to a step 512. At the step 512, the administrator or user, such as the user creating the host object 2 in the step 502, may be notified regarding a correct configuration and identification of an existing host object on the system 410 for the host 412 (e.g., the same host that the user is configuring the host object 2 for in the step 502). If the step 510 evaluates to no, control proceeds to a step 514. At the step 514, a determination is made that there is no existing host object in the management DB A 411a for the host 1 412. In particular, the step 514 makes such a determination since no existing host object in the management DB A 411a was located where the existing host object includes any initiator that matches an initiator of the initiator set 414 as included in the host object 2.

As described in connection with FIG. 8, the processing for configuration validation in the steps 504, 506, 508, 510, 512 and 514 may be performed automatically in response to the user creating the new host object 2 in the step 502.

Figure 9:
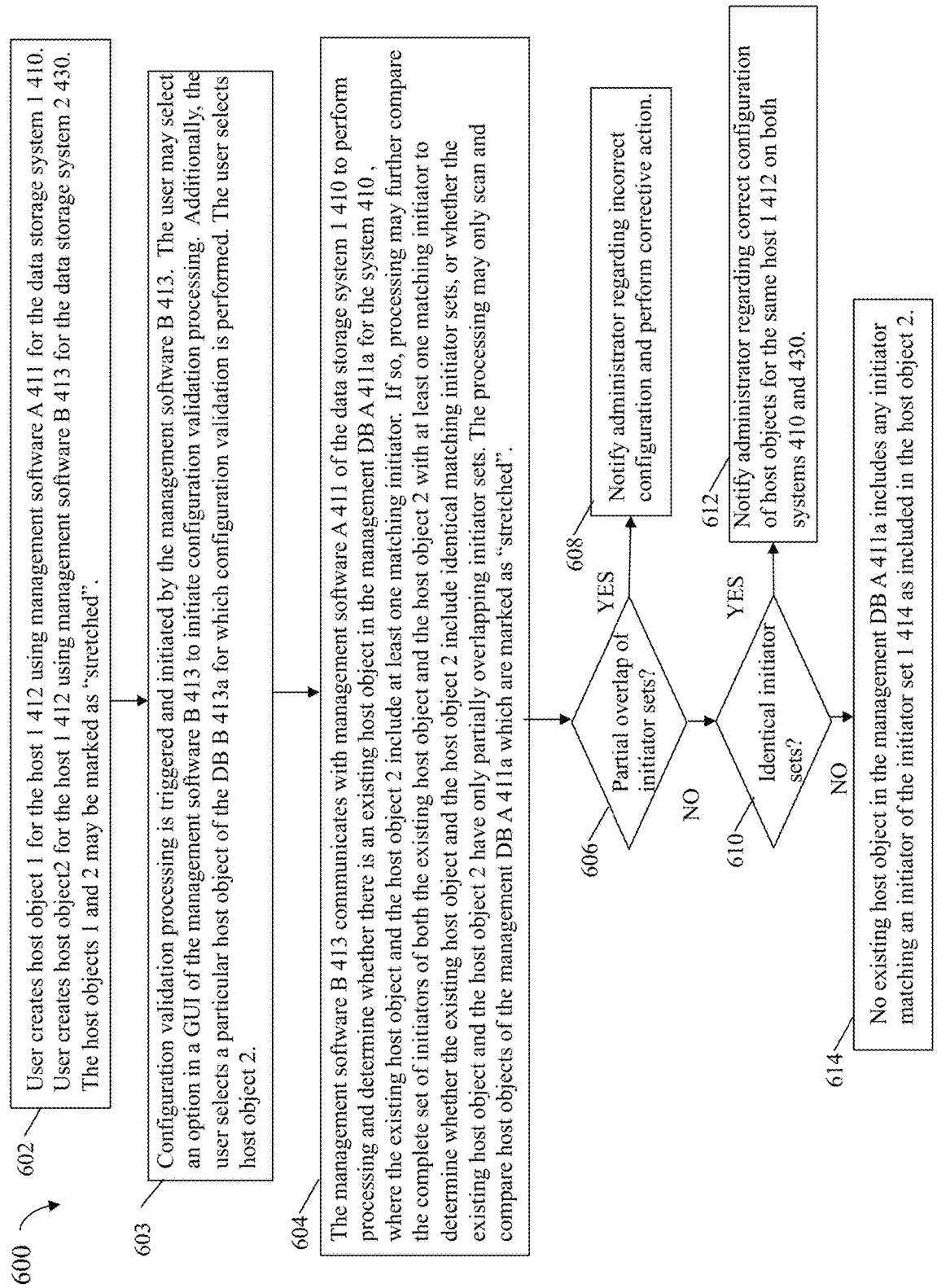

As a variation, an embodiment may perform the steps 504, 506, 508, 510, 512 and 514 in response to a separate trigger event for example, such as a user making a selection in a GUI of a management application to perform configuration validation. To further illustrate, reference is made to FIG. 9 which is a second flowchart of processing steps that may be performed in an embodiment in accordance with the techniques herein.

At a step 602, a user such as an administrator may create host object 1 for the host 1 412 using management software A 411 for the data storage system 1 410. Also in the step 602 the user creates host object 2 for the host 1 412 using management software B 413 for the data storage system 2 430. The host objects 1 and 2 may be marked as "stretched". From the step 602, control proceeds to a step 603. It should be noted that the step 603 may be performed at any suitable time subsequent to completing the step 602.

At the step 603, configuration validation processing is triggered. Generally, the configuration validation processing may be triggered and initiated by either the management software A 411 or the management software B 413. For purposes of illustration, assume that configuration validation processing is triggered and initiated by the management software B 413. For example, the user may select an option in a GUI of the management software B 413 to initiate configuration validation processing. Additionally, the user selects a particular host object of the DB B 413a for which configuration validation is performed. Assume for example the user selects host object 2. From the step 603, control proceeds to a step 604. The steps 604, 606, 608, 610, 612 and 614 correspond, respectively, to the steps 504, 506, 508, 510, 512 and 514 of FIG. 8 described above.

If the configuration validation processing is triggered in the step 603 by the management software A 411, it is straight forward to adapt the processing as described in the steps 603, 604, 606, 608, 610, 612 and 614. For example, the step 603 is adapted so that the user selects a host object, such as host object 1, from the DB A 411a used by the management software A 411. The step 604 is adapted so that the management software A 411 initiates communication with the management software B 413 to perform processing to determine whether there is an existing host object in the management DB B 413a, where the existing host object and the host object 1 include at least one matching initiator. If so, processing may further compare the complete set of initiators of both the existing host object and the host object 1 with at least one matching initiator to determine whether the existing host object and the host object 1 include identical matching initiator sets, or whether the existing host object and the host object 1 have only partially overlapping initiator sets. The processing may only scan and compare host objects of the management DB B 413a which are marked as "stretched".

Thus, with configuration validation provided with the first level of automation as described above, a user may manually or other configure host objects for the same host on both the local and remote data storage systems of a cluster, where the configuration validation may perform processing to determine whether the two host objects on the two data storage systems are correctly configured to identify the same host by the same identical initiator sets.

It should be noted that, consistent with other discussion herein, the two stretched host objects which represent the same host and which are used for host access control in two data storage systems may further be used in connection with other operations to configure a stretched volume or LUN. For example, in addition to creating the two stretched host objects for the same host in the two data storage systems in the metro configuration, volumes or LUNs may be mapped to each of the stretched host objects. For example with reference to FIG. 7A, configuring the stretched volume or LUN A for access by the host 1 412 may include creating a first host object with the initiator set 1 414 representing the host 412 using the management software 411a of the system 410, creating second host object with the initiator set 1 414 representing the host 412 using the management software 413a of the system 430, mapping the LUN A 425a to the first host object of the first data storage system 410, and mapping the LUN A" 425b to the second host object of the second data storage system 430. In a similar manner, the embodiment may include other operations or commands such as a command that unmaps a volume or LUN from a stretched host object.

In at least one embodiment, a second level of automation may be provided. The second level of automation may also be referred to herein as full automation. Generally, with full automation, a user may use management software to create a first host object specifying access control for the host with respect to resources of a first data storage system. Subsequently, the management software may be used to automatically create a second host object specifying access control for the same host with respect to resource of a second data storage system. The first and second data storage systems may be in a metro cluster configuration when the management software creates a stretched host object on the first data storage system. Subsequently, the management software orchestrates automatically creating a second host object on the second data storage system communicating over a network of the metro cluster. The second host object may specify the same identical initiator set as the first host object whereby both the first and second host objects represent the same host. The foregoing and other operations or commands that may be supported and performed by management software (e.g., management software 411a, 413a) in connection with the full automation are described in more detail in the following paragraphs.

A first operation or command may be included in the full automation that creates a stretched host object. In connection with creating a stretch host object, processing may be performed where the storage administrator provides parameters or inputs in connection with the host object being created. The parameters or inputs include: specifying that the host object being created is "stretched", the host object name, operating system type, associated initiators (e.g., which may be discovered by the data storage system based on initiators that have logged into to target ports of the data storage system or entered manually). The parameters or inputs may also optionally identify which data storage system in the metro cluster pair of storage systems is local with respect to the host for which the host object is created. The latter input identifying the local data storage system may be used, for example, in an embodiment in accordance with the ALUA standard in connection with setting ALUA path states expected to provide lower I/O latency for the host. Paths from the host to the local data storage system may be set to active optimized and paths from the host to the remaining remote data storage system may be set to active non-optimized (e.g., since I/Os on such latter paths to the remote data storage system are expected to generally result in longer I/O latency than the former paths to the local data storage system). For example, paths from initiators of the host to the local data storage system may be set to active optimized. Additionally, other paths from one or more initiators of the host to the other remaining data storage system of the cluster pair may be set to active non-optimized.

Processing performed for the first operation to create the stretched host object may include:

S1) Persisting the host object. For example, assume the host object is created for the host 112 using the management software 411 for the data storage system 410. In this case, the host object being created may be persisted to the management DB A 411a.

S2) Performing storage system architecture specific configuration such as initiator group creation. The initiator group may be a logically defined group on the data storage system that is created to include the set initiators input for the host as an input or parameter. For example, the initiator set 1 414 may be input as a parameter and stored as part of the host object for the host 412. Additionally, an initiator group may be created for the initiator set 1 414.

S3) Orchestrating host object creation on the other data storage system in the metro cluster pair. For example, if the host object is created as noted above for the host 112 using the management software 411 for the data storage system 410, the step S3 creates a matching host object for the host 112 for use with the data storage system 430. The matching host object on the system 430 may include the same parameters as the host object created and persisted in the step S1 for the system 410. In particular, both the host object for the system 410 and the matching host object for the system 430 include identical initiator sets.

The processing steps performed for the first operation to create a stretched host object are performed transactionally such that all the steps are completed successfully or alternatively no configuration changes are made. An embodiment may optionally validate the initiator set specified for the host objects created based on the SCSI initiators that have logged into the target ports of both of the data storage systems of the metro cluster configuration. Based on the particular initiators that have logged into the target ports of both storage systems, configuration problems or errors may be detected (e.g., inconsistencies between the initiator set provided as an input or parameter, and the actual existing connections or paths from the host to the data storage system). For example, a user may have provided an initiator I15 as an initiator in the initiator set for the host 412. However, a configuration error may be detected in that no initiator I15 has logged into any target port of either system 410, 430.

A second operation or command may be included in the full automation that modifies an existing stretched host object. In connection with modifying an existing stretch host object, processing may be performed where the storage administrator specifies a modification that includes one or more of: a new host object name, a new operating system type, adding or deleting SCSI initiators (e.g., which may be discovered by the storage system based on initiators that have logged into target ports of the data storage system or entered manually), a change with respect to the data storage system that is local or co-located with the host represented by the host object that is modified.

Processing for the second operation to modify an existing stretched host object may include:

S11) Persisting the requested changes to the host object. For example, assume the host object is modified for the host 112 using the management software 411 for the data storage system 410. In this case, the host object may be persisted to the management DB A 411*a*.

S12) Performing storage system architecture specific configuration, such as update an existing initiator group, for example, if the modification in the step S21 includes a change to the existing initiators specified for the host object.

S13) Orchestrate host object modification on the other data storage system in the metro cluster pair. For example, if the host object is modified as noted above for the host 112 using the management software 411 for the data storage system 410, the step S13 modifies a matching host object for the host 112 for use with the data storage system 430. The matching host object on the system 430 may be identified as having an initiator set that is identical to the initiator set of the existing stretched host object operated on in the step S11. Note that the foregoing identical initiator sets is with respect to the initiator set of the existing stretched object before any modification is applied in the step S11.

The processing steps performed for the second operation to modify an existing stretched host object are performed transactionally such that all the steps are completed successfully or alternatively no configuration changes are made. An embodiment may optionally validate the initiator set specified for the host objects modified based on the SCSI initiators that have logged into the target ports of both of the data storage systems of the metro cluster configuration. Based on the particular initiators that have logged into the target ports, configuration problems or errors may be detected (e.g., inconsistencies between the initiator set provided as an input or parameter, and the actual existing connections or paths from the host to the data storage systems). For example, a user may have provided an initiator I15 as an initiator in the initiator set for the host 412. However, a configuration error may be detected in that no initiator I15 has logged into any target port of either system 410, 430.

A third operation or command may be included in the full automation that stretches an existing host object that is local or unstretched having only a single host object on one of the data storage systems 410, 430 of the metro cluster. In connection with stretching an existing local or unstretched host object for a host, processing may be performed where the storage administrator selects an existing host object for the host that is local and currently "unstretched". In particular, the third operation may be performed using management software for a data storage system and the host object exists in the management DB of the data storage system. The data storage system may be local with respect to the host represented by the host object. For example, the data storage system and the host may be located in the same data center. For the selected local host object for the third operation, the user requests to create a matching host object on the other remote data storage system of the metro cluster pair. The processing for stretching an existing host object (that is local or unstretched) may include modifying a property of the existing host object to indicate that the host object is now "stretched" having a matching remote counterpart host object for the host on the remote data storage system.

The processing for stretching a host object with the third operation may include:

S21) Performing storage system architecture specific configuration, such as updating any ALUA path states for volumes or LUNs already mapped to the host. For example, consider an unstretched host object for a host that is local to only the data storage system 410. If volumes or LUNs currently mapped to the host object being stretched are only local to the storage system 410, then no ALUA path state change is needed. Such LUNs that are currently mapped to the host object are local only to the storage system 410 have at least one path from the host to the storage system 410, where the at least one path is active optimized and does not require any further state changes.

However if the host and associated host object are local to the storage system 410 and at least one LUN mapped to the host object is stretched across both the storage systems 410 and 430, the copy of the LUN on storage system 430 will need to be mapped to the newly stretched host object on the system 430 as well. ALUA path state changes may be made so that the host being local to storage system 410 has one or more active optimized paths to the stretched LUN copy on the system 410 and one or more active unoptimized paths to the stretched LUN copy on the system 430.

S22) Orchestrating host object creation on the other remote data storage system in the metro cluster pair. The host object created on the other remote data. For example, if the existing host object for the host 112 is stretched using the management software 411 for the data storage system 410, the step S22 may include automatically creating a matching host object for the host 112 for use with the data storage system 430. The matching host object on the system 430 may have the same parameters as the existing host object for the host 112 in the system 410.

S23) Persisting the host object modification to the existing host object as a stretched host object.

The processing steps for the third operation to stretch an existing local host object are performed transactionally such that all the steps are completed successfully or alternatively no configuration changes are made. An embodiment may optionally validate the initiator set specified for the host objects modified based on the SCSI initiators that have logged into the target ports of both of the data storage systems of the metro cluster configuration. Based on the particular initiators that have logged into the target ports, configuration problems or errors may be detected (e.g., inconsistencies between the initiator set provided as an input or parameter, and the actual existing connections or paths from the host to the data storage systems). For example, a user may have provided an initiator I15 as an initiator in the initiator set for the host 412. However, a configuration error may be detected in that no initiator I15 has logged into any target port of either system 410, 430.

A fourth operation or command may be included in the full automation that unstretches an existing stretched host object. In connection with unstretching an existing stretched host object for a host, processing may be performed where the storage administrator selects an existing stretched host object for the host where a first host object for the host is included in a first data storage system of the metro cluster pair and a second host object for the host is included in the second data storage system for the host, where the first and second host objects have the same initiator sets. With the unstretch host object command, a request is made to only keep one of the foregoing two host objects for the host on one of the data storage systems and delete the other corresponding host object for the host on the other data storage system of the metro cluster. For example, the fourth operation to unstretch a host object may be performed using the management software A 411 for the data storage system 410 for an existing stretched host object 1 of the management DB 411*a*. The existing stretched host object 1 may have a matching counterpart host object that is existing stretched host object 2 in the management DB 413*a* of the data storage system 430. Both the host object 1 and the host object 2 may represent the same host 412. For the selected existing stretched host object 1, the user requests with the fourth operation to delete the matching host object 2 on the other remote data storage system 430 of the metro cluster pair.

Processing for the fourth operation, the unstretch host object command, may include modifying a property of the existing host object 1 to indicate that the host object is now "unstretched" thereby denoting that the host object 1 does not have a matching remote counterpart host object for the host on the remote data storage system 430.

Processing for the fourth operation to unstretch an existing stretched host object for a host may include:

S31) Optionally checking if there are volumes or LUNs mapped to the existing stretched host object and notifying the storage administrator of potential access loss due to the deletion of the remote counterpart host object on the remote data storage system for the host. Assuming, for example, the existing stretched host object is the host object 1 on the system 410 for the host 412, deleting the matching host object 2 for the same host 412 on the remote data storage system 430 results in the host 412 losing access to any volumes or LUNs on the remote data storage system 430.

S32) Performing storage system architecture specific configuration, such as unmapping volumes or LUNs from the host on the data storage system where the host object is deleted from.

S33) Orchestrating host object deletion on one of the data storage systems of the metro cluster pair. For example, assuming the fourth operation to unstretch an existing host object for the host 412 is initiated on the data storage system 410, the matching host object may be deleted from the other remote data storage system 430.

S34). Persisting host object modification as a Host Object that is not "stretched" on one side. For example, assuming the fourth operation to unstretch an existing host object for the host 412 is initiated on the data storage system 410, the matching host object may be deleted from the other remote data storage system 430, and the remaining host object on the system 410 may be persistently stored with a modified attribute or property of "unstretched".

The processing steps for the fourth operation to unstretch an existing stretched host object are performed transactionally such that all the steps are completed successfully or alternatively no configuration changes are made.

A fifth operation or command may be included in the full automation that maps an unstretched volume or LUN to a stretched host object. The volume or LUN may be characterized as an unstretched volume or LUN existing on only one data storage system within the metro cluster pair. The host object may be characterized as stretched in that the host object representing a host also has a matching counterpart remote host object (representing the same host) on the other data storage system of the metro cluster pair. The stretched host object is used to grant access of the non-stretched LUN to the host represented by the stretched host object.

In connection with the fifth operation, it should be noted that not all volumes or LUNs exposed to a host represented by a stretched host object may be stretched LUNs. As such, the fifth operation may be used to map such unstretched LUNs existing on only one data storage system of the metro cluster to the host represented by the stretched host object. As a result, the stretched host only discovers the unstretched volume or LUN on a subset of target ports that the host is connected to. For example the stretched host may be a host such as the host 412 connected to target ports T11-T14 and T31-T34 spanning two data storage systems, such as the systems 410 and 430. If the unstretched volume or LUN is only included in the data storage system 410, then the unstretched volume or LUN is only exposed over target ports T11-T14 of the system 410.

An embodiment may also include a first variation of the fifth operation with an option to convert the unstretched volume or LUN to a stretched volume, and then map the stretched volume to the stretched host object. In connection with this first variation of the fifth operation, for the non-stretched volume or LUN on a first data storage system of the metro configuration, processing may include creating a counterpart remote LUN on the second remote data storage system of the metro configuration. Consistent with other discussion herein regarding a stretched volume or LUN, from the external host perspective, the counterpart remote LUN is configured to have the same identity as the non-stretched LUN on the first data storage system. Subsequently, processing may be performed as described in connection with a sixth operation to map a stretched volume or LUN to a stretched host object. The sixth operation to map a stretched volume or LUN to a stretched host object is described in more detail below.

The sixth operation or command may be included in the full automation that maps a stretched volume or LUN to a stretched host object. For the sixth operation to map a stretched volume to a stretched host object, the storage administrator selects an existing "stretched" host object and requests to map a "stretched" volume to it. The operation can be initiated on either data storage system in a metro cluster configuration. Processing for the sixth operation includes granting access of the stretched volume or LUN on both data storage systems 410, 430 to the stretched host represented by the stretched host object.

Consistent with discussion herein such as in connection with FIG. 5, a stretched volume is configured from a volume pair (R1, R2), where R1 and R2 are LUNs or volumes respectively on two data storage systems of the metro cluster and R1 and R2 are configured to have the same identity and appear to a host as the same volume or LUN. Processing performed for the sixth operation to map the stretched volume configured from the volume pair (R1, R2) to a stretched host may include:

S61) Performing storage system architecture specific configuration to grant the stretched host access to the specified volume R1 on the data storage system where the sixth operation is initiated.

S62) Performing storage system architecture specific configuration to grant the stretched host access to the specified volume R2 on the other data storage system in the metro cluster configuration.

For example, with reference to FIG. 7A, assume the sixth operation is executed to map the stretched LUN A to the stretched host 412. The stretched host 412 may have a first host object 1 on the system 410 and a second matching host object 2 on the system 430. The stretched LUN A is configured from the LUN A 425a on the system 410 and the LUN A" 425b on the system 430, where both volumes or LUNs 425a, 425b are configured to have the same identity and appear to external hosts such as the host 412 as the same stretched LUN A. Processing for the sixth command to map the stretched LUN A to the stretched host 412 may include performing processing on the system 410 to grant access of the LUN A 425a to the host object 1 for the host 412, and performing processing on the system 410 to grant access of the LUN A" 425b to the host object 2 for the host 412.

The processing steps for the sixth operation to map a stretched volume to an existing stretched host object are performed transactionally such that all the steps are completed successfully or alternatively no configuration changes are made. For example, processing for the sixth operation results in either:

A) the stretched host object 1 representing the host 412 on the system 410 granted access to the LUN A 425a, and the stretched host object 2 representing the host 412 on the system 430 granted access to the LUN A"425b; or otherwise B) there is no configuration change.

A seventh operation or command may be included in the full automation that deletes a stretched host object. For the seventh operation to delete a stretched host object, the storage administrator selects an existing "stretched" host object and requests to delete it. Processing for the seventh operation to delete a stretched host object includes:

S71) Optionally checking if there are volumes mapped to the stretched host and notifying the storage admin of potential access loss to any such volumes on both the data storage systems of the metro cluster.

S72) Performing storage system architecture specific configuration, such as unmapping volumes from the host.

S73) Orchestrating host object deletion on both data storage systems of the metro cluster pair. For example, the stretched host object indicates that there is a first host object 1 for the host on the data storage system 410 and a matching second host object 2 for the host on the data storage system 430. The step S73 includes deleting the host object 1 and the host object 2.

The processing steps for the seventh operation to delete an existing stretched host object are performed transactionally such that all the steps are completed successfully or alternatively no configuration changes are made.

An eight operation or command may be included in the full automation that unmaps an unstretched volume or LUN from a stretched host object. The volume or LUN may be characterized as an unstretched volume or LUN existing on only one data storage system within the metro cluster pair. The host object may be characterized as stretched in that the host object representing a host also has a matching counterpart remote host object (representing the same host) on the other data storage system of the metro cluster pair. The stretched host object is used to grant access of the non-stretched LUN to the host represented by the stretched host object. The unmapping of an unstretched volume from a stretched host object as performed by the eighth operation results in the unstretched volume no longer being accessible to the host represented by the stretched host object.

A ninth operation or command may be included in the full automation that unmaps a stretched volume or LUN from a stretched host object. For the ninth operation to unmap a stretched volume to a stretched host object, the storage administrator selects an existing "stretched" host object and requests to unmap a selected "stretched" volume from the stretched host object. The operation can be initiated on either data storage system in a metro cluster configuration. Processing for the ninth operation includes removing access of the stretched volume or LUN on both data storage systems 410, 430 from the stretched host represented by the stretched host object.

Consistent with discussion herein such as in connection with FIG. 5, a stretched volume is configured from a volume pair (R1, R2), where R1 and R2 are LUNs or volumes respectively on two data storage systems of the metro cluster and R1 and R2 are configured to have the same identity and appear to a host as the same volume or LUN. Processing performed for the ninth operation to unmap the stretched volume (configured using the volume pair (R1, R2)) from a stretched host may include:

S91) Performing storage system architecture specific configuration to no longer grant the stretched host access to the specified volume R1 on the data storage system where the sixth operation is initiated.

S92) Performing storage system architecture specific configuration to no longer grant the stretched host access to the specified volume R2 on the other data storage system in the metro cluster configuration.

For example, with reference to FIG. 7A, assume the ninth operation is executed to unmap the stretched LUN A from the stretched host 412. The stretched host 412 may have a first host object 1 on the system 410 and a second matching host object 2 on the system 430. The stretched LUN A is configured from the LUN A 425a on the system 410 and the LUN A" 425b on the system 430, where both volumes or LUNs 425a, 425b are configured to have the same identity and appear to external hosts such as the host 412 as the same stretched LUN A. Processing for the ninth command to unmap the stretched LUN A from the stretched host 412 may include performing processing on the system 410 to unmap access of the LUN A 425a from the host object 1 for the host 412, and performing processing on the system 410 to unmap access of the LUN A: 425b from the host object 2 for the host 412.

The processing steps for the ninth operation to unmap a stretched volume from an existing stretched host object are performed transactionally such that all the steps are completed successfully or alternatively no configuration changes are made. For example, processing for the ninth operation results in either:

A) the stretched host object 1 representing the host 412 on the system 410 is no longer access to the LUN A 425a, and the stretched host object 2 representing the host 412 on the system 430 is no longer granted access to the LUN A"425b; or otherwise B) there is no configuration change.

In at least one embodiment, host groups may be supported. A host group is a logically defined set of one or more hosts. A host group may be presented and used in connection with the various commands and operations as described herein. For example, in operations or commands described herein such as in connection with the full automation, the operation or command may be applied to a host and also a host group. If a host group is specified with an operation or command, the operation or command may be applied transactionally to all hosts of the host group. In this case, either the command is performed successfully for all hosts in the host group, or otherwise there are no configuration changes made as a result of the command. For example, when a volume is mapped to a host group, the volume is transactionally mapped to all hosts in the group, or not mapped to any host in the group.

In at least one embodiment, volume groups may be supported. A volume group or storage group is a logically defined set of one or more volumes or LUNs. Any operation as described herein as applied to a LUN or volume may also be applied transactionally to a volume group.

An embodiment may provide both the first level of automation of configuration validation and also the second level of automation or full automation. In such an embodiment, a configurable or selectable option may be specified which designates which one of the levels or modes of automation are enabled.

Figure 10:
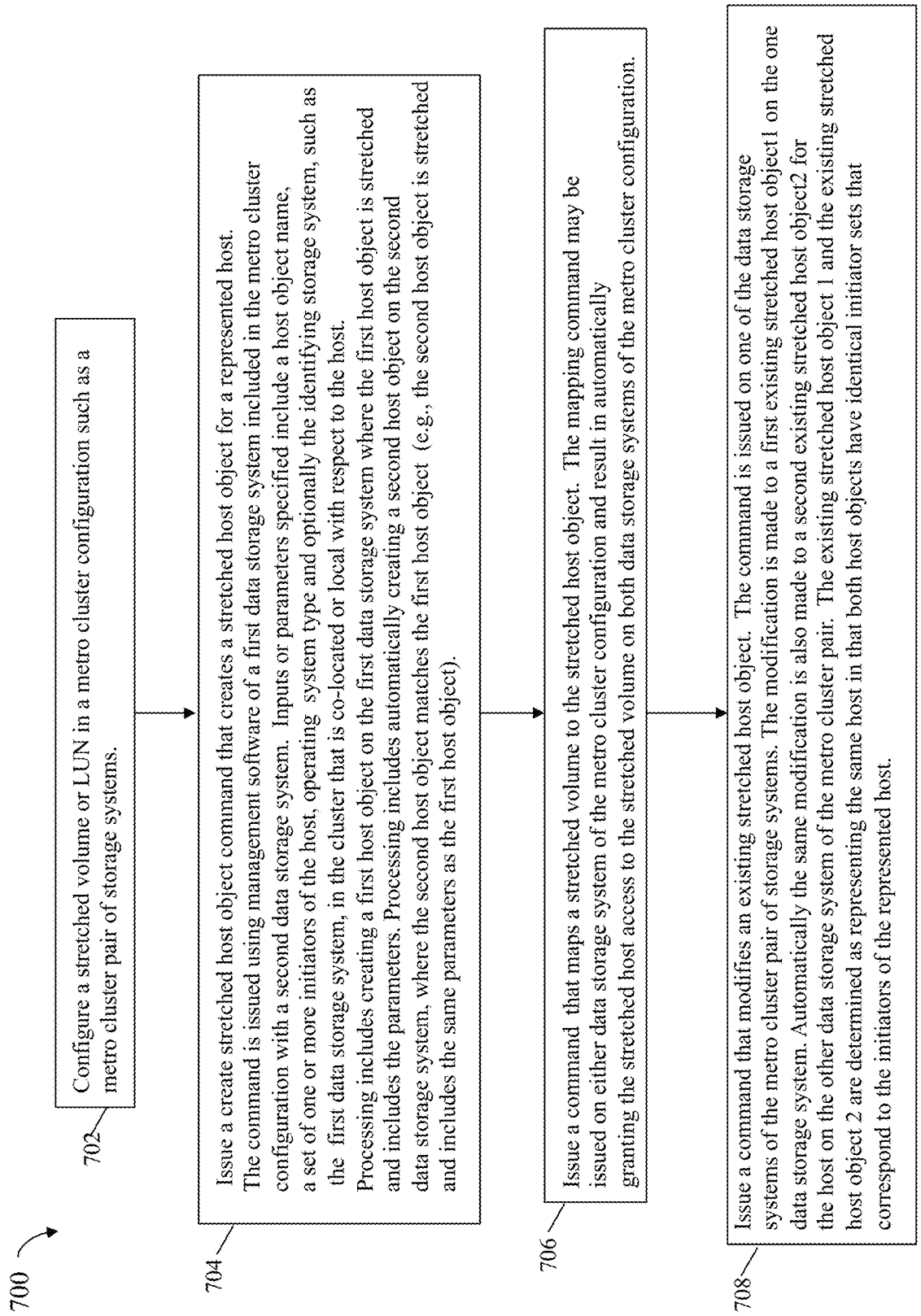

Referring to FIG. 10, shown is a third flowchart of processing steps that may be performed in an embodiment in accordance with the techniques herein. The flowchart 700 describes processing steps that may be performed in an embodiment using operations or commands of the level of full automation. The processing of FIG. 10 includes commands that may be issued to provide a host connectivity or access to a stretched volume or LUN.

At a step 702, processing is performed to configure a stretched volume or LUN in a metro cluster configuration such as a metro cluster pair of data storage systems as described, for example, in connection with FIG. 7A. From the step 702, control proceeds to a step 704.

At the step 704, a stretched host object command is issued that creates a stretched host object for a represented host. The command is issued using management software of a first data storage system included in the metro cluster configuration with a second data storage system. Inputs or parameters specified may include a host object name, a set of one or more initiators of the host, operating system type and optionally the identifying storage system, such as the first data storage system, in the cluster that is co-located or local with respect to the host. Processing of the step 704 also includes creating a first host object on the first data storage system, where the first host object is stretched and includes the parameters. Processing of the step 704 includes automatically creating a second host object on the second data storage system, where the second host object matches the first host object (e.g., the second host object is stretched and includes the same parameters as the first host object). From the step 704, control proceeds to a step 706.

At the step 706, a command is issued that maps a stretched volume to a stretched host object. The mapping command may be issued on either data storage system of the metro cluster configuration and result in automatically granting the stretched host access to the stretched volume on both data storage systems of the metro cluster configuration. From the step 706, control proceeds to a step 708.

At the step 708, a command is issued that modifies an existing stretched host object. The command is issued on one of the data storage systems of the metro cluster pair of storage systems. The modification is made to a first existing stretched host object 1 on the one data storage system. Automatically the same modification is also made to a second existing stretched host object 2 for the host on the other data storage system of the metro cluster pair. The existing stretched host object 1 and the existing stretched host object 2 are determined as representing the same host in that both host objects have identical initiator sets that correspond to the initiators of the represented host. The modification may be, for example, to add or delete an initiator from the initiator set of the host. In this case, both the same modification to add or delete an initiator is performed to both existing stretched host objects 1 and 2.

Consistent with discussion herein, the step 704 creates the access control mechanisms (e.g. the host objects) for the host on both the first and second data storage systems. The step 706 maps the stretched volume to the existing stretched host objects for the host to thereby provide the host access to the stretched volume on both the first and second data storage systems. In particular, as a result of completing the steps 702, 704 and 706, the initiators in the initiator set of the host are allowed to access the stretched volume as exposed through target ports of the first and the second data storage systems.

The techniques herein may be performed by any suitable hardware and/or software. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of configuring data storage systems to provide host access comprising:
configuring a stretched volume using a first volume on a first data storage system and a second volume on a second data storage system, wherein the first volume is exposed over a first path to a host and the second volume is exposed over a second path to the host, wherein the first volume and the second volume are configured as a same logical volume and exposed to the host as the same logical volume over a plurality of paths including the first path and the second path, wherein the first path is between the host and the first data storage system and the second path is between the host and the second data storage system;

performing processing that allows the host access to the stretched volume over the plurality of paths, said processing including:
   receiving a first command to create a first host object that is stretched, wherein the first host object specifies access control in the first data storage system for the host;
   in response to receiving the first command, performing first processing including:
      creating the first host object that is stretched on the first data storage system, wherein the first host object includes a first initiator set comprising one or more initiators of the host; and
      creating a second host object that is stretched on the second data storage system, wherein the second host object includes the first initiator set and specifies access control in the second data storage system for the host;
   receiving a second command to map the stretched volume to the first host object that is stretched; and
   in response to receiving the second command, performing second processing including granting the host access to the stretched volume on the first data storage system and the second data storage system;
   receiving another command to map an unstretched volume to the first host object that is stretched on the first data storage system, wherein the unstretched volume is a local volume of the first data storage system; and
   in response to receiving the another command, mapping the unstretched volume to the first host object thereby granting the first host object and the host access to the unstretched volume, wherein the unstretched volume remains unstretched after said mapping the unstretched volume to the first host object where, after said mapping the unstretched volume to the first host object, the unstretched volume remains a local volume on the first data storage system and does not have a remote counterpart volume on the second data storage system with a same identity as the unstretched volume.

2. The method of claim 1, wherein the first initiator set is discovered by the first data storage system based on initiators of the host that are logged into one or more target ports of the first data storage system.

3. The method of claim 1, wherein the first initiator set is included as an input parameter of the first command.

4. The method of claim 1, wherein the first initiator set is used to uniquely identify the host from a plurality of other hosts, wherein the plurality of other hosts and the host are connected to the first data storage system and also connected to the second data storage system.

5. The method of claim 1, wherein the host includes a first initiator and a second initiator, wherein the first initiator set includes the first initiator and the second initiator, and wherein the first path is from the first initiator to a first target port of the first data storage system and the second path is from the second initiator to a second target port of the second data storage system.

6. The method of claim 1, wherein the first volume and the second volume are configured for synchronous replication of writes from the first volume to the second volume and synchronous replication of writes from the second volume to the first volume.

7. The method of claim 1, wherein the second processing includes:
   mapping the stretched volume to the first host object to grant the host access to the stretched volume on the first data storage system; and
   mapping the stretched volume to the second host object on the second data storage system to grant the host access to the stretched volume on the second data storage system.

8. The method of claim 7, wherein said mapping the stretched volume to first host object includes mapping the first volume to the first host object, and wherein said mapping the stretched volume to second host object includes mapping the second volume to the second host object.

9. The method of claim 1, further comprising:
   receiving a third command to perform a modification to the first host object that is stretched; and
   in response to receiving the third command, performing third processing including:
      updating the first host object in accordance with the modification; and
      updating the second host object on the second data storage system in accordance with the modification.

10. The method of claim 1, wherein a third host object on the first data storage system represents a second host connected to the first data storage system, wherein the third host object is unstretched or local indicating that the second host has connectivity to the first data storage system but not the second data storage system.

11. The method of claim 10, further comprising:
   receiving a third command to stretch the third host object; and
   in response to receiving the third command, performing third processing including:
      setting an attribute of the third host object to indicate that the third host object is stretched;
      creating a fourth host object that is stretched on the second data storage system for the second host, wherein the third host object and the fourth host object each include a second initiator set of one or more initiators of the second host.

12. The method of claim 11, further comprising:
   receiving a fourth command to map a third volume of the first data storage system to the third host object; and
   in response to receiving the fourth command, granting the third host object access to the third volume, wherein the third volume is not a stretched volume.

13. The method of claim 1, wherein a first parameter of the first command identifies that the first data storage system is local with respect to the host whereby the host is co-located in a same data center as the first data storage system.

14. The method of claim 13, wherein the first processing includes:
   setting at least one path from the host to the first data storage system to active optimized; and
   setting at least one path from the host to the second data storage system to active non-optimized.

15. The method of claim 14, wherein the first path from the host to the first data storage system is active optimized and the second path from the host to the second data storage system is active non-optimized, and wherein the method further comprises:
   selecting, by the host, a particular path over which to send an I/O operation directed to the same logical volume, wherein said selecting selects the first path as the particular path rather than the second path since the first path is active optimized and the second path is active non-optimized; and sending the I/O operation directed to the same logical volume over the first path from the host to the first data storage system.

16. A system comprising:

one or more processors; and one or more memories comprising code stored thereon that, when executed, perform a method of configuring data storage systems to provide host access comprising:

configuring a stretched volume using a first volume on a first data storage system and a second volume on a second data storage system, wherein the first volume is exposed over a first path to a host and the second volume is exposed over a second path to the host, wherein the first volume and the second volume are configured as a same logical volume and exposed to the host as the same logical volume over a plurality of paths including the first path and the second path, wherein the first path is between the host and the first data storage system and the second path is between the host and the second data storage system;

performing processing that allows the host access to the stretched volume over the plurality of paths, said processing including:

receiving a first command to create a first host object that is stretched, wherein the first host object specifies access control in the first data storage system for the host;

in response to receiving the first command, performing first processing including:

creating the first host object that is stretched on the first data storage system, wherein the first host object includes a first initiator set comprising one or more initiators of the host; and creating a second host object that is stretched on the second data storage system, wherein the second host object includes the first initiator set and specifies access control in the second data storage system for the host;

receiving a second command to map the stretched volume to the first host object that is stretched; and in response to receiving the second command, performing second processing including granting the host access to the stretched volume on the first data storage system and the second data storage system;

receiving another command to map an unstretched volume to the first host object that is stretched on the first data storage system, wherein the unstretched volume is a local volume of the first data storage system; and in response to receiving the another command, mapping the unstretched volume to the first host object thereby granting the first host object and the host access to the unstretched volume, wherein the unstretched volume remains unstretched after said mapping the unstretched volume to the first host object where, after said mapping the unstretched volume to the first host object, the unstretched volume remains a local volume on the first data storage system and does not have a remote counterpart volume on the second data storage system with a same identity as the unstretched volume.

17. A computer readable medium comprising code stored thereon that, when executed, performs a method of configuring data storage systems to provide host access comprising:

configuring a stretched volume using a first volume on a first data storage system and a second volume on a second data storage system, wherein the first volume is exposed over a first path to a host and the second volume is exposed over a second path to the host, wherein the first volume and the second volume are configured as a same logical volume and exposed to the host as the same logical volume over a plurality of paths including the first path and the second path, wherein the first path is between the host and the first data storage system and the second path is between the host and the second data storage system;

performing processing that allows the host access to the stretched volume over the plurality of paths, said processing including:

receiving a first command to create a first host object that is stretched, wherein the first host object specifies access control in the first data storage system for the host;

in response to receiving the first command, performing first processing including:

creating the first host object that is stretched on the first data storage system, wherein the first host object includes a first initiator set comprising one or more initiators of the host; and creating a second host object that is stretched on the second data storage system, wherein the second host object includes the first initiator set and specifies access control in the second data storage system for the host;

receiving a second command to map the stretched volume to the first host object that is stretched; and in response to receiving the second command, performing second processing including granting the host access to the stretched volume on the first data storage system and the second data storage system;

receiving another command to map an unstretched volume to the first host object that is stretched on the first data storage system, wherein the unstretched volume is a local volume of the first data storage system; and in response to receiving the another command, mapping the unstretched volume to the first host object thereby granting the first host object and the host access to the unstretched volume, wherein the unstretched volume remains unstretched after said mapping the unstretched volume to the first host object where, after said mapping the unstretched volume to the first host object, the unstretched volume remains a local volume on the first data storage system and does not have a remote counterpart volume on the second data storage system with a same identity as the unstretched volume.

18. The computer readable medium of claim 17, wherein the first initiator set is discovered by the first data storage system based on initiators of the host that are logged into one or more target ports of the first data storage system.

19. The computer readable medium of claim 17, wherein the first initiator set is used to uniquely identify the host from a plurality of other hosts, wherein the plurality of other hosts and the host are connected to the first data storage system and also connected to the second data storage system.

20. The computer readable medium of claim 17, wherein the host includes a first initiator and a second initiator, wherein the first initiator set includes the first initiator and the second initiator, wherein the first path is from the first initiator to a first target port of the first data storage system and the second path is from the second initiator to a second target port of the second data storage system, and wherein the first volume and the second volume are configured for synchronous replication of writes from the first volume to the second volume and synchronous replication of writes from the second volume to the first volume.

* * * * *